(12) United States Patent
Shiplacoff et al.

(10) Patent No.: US 8,373,673 B2
(45) Date of Patent: *Feb. 12, 2013

(54) USER INTERFACE FOR INITIATING ACTIVITIES IN AN ELECTRONIC DEVICE

(75) Inventors: Daniel Marc Gatan Shiplacoff, Los Altos, CA (US); Matias Gonzalo Duarte, Mountain View, CA (US); Jeremy Godfrey Lyon, Sunnyvale, CA (US); Richard R. Dellinger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/331,849

(22) Filed: Dec. 20, 2011

(65) Prior Publication Data

US 2012/0216143 A1 Aug. 23, 2012

Related U.S. Application Data

(63) Continuation of application No. 12/505,543, filed on Jul. 20, 2009, now Pat. No. 8,159,469, which is a continuation-in-part of application No. 12/115,992, filed on May 6, 2008.

(51) Int. Cl.
*G06F 3/041* (2006.01)
(52) U.S. Cl. .................................. 345/173; 345/156
(58) Field of Classification Search .................. 345/156, 345/173–175, 177; 178/18.01–18.07, 19.01–19.05
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,600,936 | B1 | 7/2003 | Karkkainen et al. |
| 6,677,932 | B1 | 1/2004 | Westerman |
| 7,030,861 | B1 | 4/2006 | Westerman et al. |
| 7,479,949 | B2 | 1/2009 | Jobs et al. |
| 7,663,607 | B2 | 2/2010 | Hotelling et al. |
| 7,800,592 | B2 | 9/2010 | Kerr et al. |
| 8,001,488 | B1 | 8/2011 | Lam |
| 2002/0033848 | A1 | 3/2002 | Sciammarella et al. |
| 2004/0100479 | A1 | 5/2004 | Nakano et al. |
| 2005/0003851 | A1 | 1/2005 | Chrysochoos et al. |

(Continued)

FOREIGN PATENT DOCUMENTS

EP 1 462 921 A2 9/2004

OTHER PUBLICATIONS

International Preliminary Report on Patentability, International Application No. PCT/US2010/038037, Date of Mailing: Feb. 2, 2012, pp. 1-6.

(Continued)

*Primary Examiner* — Ricardo L Osorio

(57) ABSTRACT

In one embodiment, a user interface is presented for initiating activities in an electronic device. The user interface includes an element referred to as a "launch wave", which can be activated at substantially any time, even if the user is engaged with an activity, without requiring the user to first return to a home screen. In various embodiments, the user can activate the launch wave by performing a gesture, or by pressing a physical button, or by tapping at a particular location on a touchscreen, or by activating a keyboard command. In one embodiment, activation of the launch wave and selection of an item from the launch wave can be performed in one continuous operation on a touch-sensitive screen, so as to improve the expediency and convenience of launching applications and other items.

15 Claims, 18 Drawing Sheets

U.S. PATENT DOCUMENTS

| | | |
|---|---|---|
| 2005/0024322 A1 | 2/2005 | Kupka |
| 2005/0057524 A1 | 3/2005 | Hill et al. |
| 2006/0053387 A1 | 3/2006 | Ording |
| 2006/0085757 A1 | 4/2006 | Andre et al. |
| 2006/0097991 A1 | 5/2006 | Hotelling et al. |
| 2006/0197753 A1 | 9/2006 | Hotelling |
| 2006/0267951 A1 | 11/2006 | Rainisto |
| 2007/0101292 A1 | 5/2007 | Kupka |
| 2007/0152984 A1 | 7/2007 | Ording et al. |
| 2007/0273668 A1 | 11/2007 | Park et al. |
| 2007/0277124 A1 | 11/2007 | Shin et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0082930 A1 | 4/2008 | Omernick et al. |
| 2008/0084400 A1 | 4/2008 | Rosenberg |
| 2008/0084440 A1 | 4/2008 | Rosenberg |
| 2008/0104544 A1 | 5/2008 | Collins et al. |
| 2008/0297484 A1 | 12/2008 | Park et al. |
| 2008/0303794 A1 | 12/2008 | Bolt et al. |
| 2008/0316183 A1 | 12/2008 | Westerman et al. |
| 2010/0095240 A1 | 4/2010 | Shiplacoff et al. |
| 2010/0156656 A1 | 6/2010 | Duarte et al. |
| 2010/0156813 A1 | 6/2010 | Duarte et al. |
| 2010/0169766 A1 | 7/2010 | Duarte et al. |
| 2010/0295801 A1 | 11/2010 | Bestle et al. |

OTHER PUBLICATIONS

Office Action mailed May 18, 2011, for related U.S. Appl. No. 12/115,992, filed May 6, 2008.

Office Action mailed Oct. 31, 2011, for related U.S. Appl. No. 12/115,992, filed May 6, 2008.

Office Action mailed Mar. 6, 2012, for related U.S. Appl. No. 12/115,992, filed May 6, 2008.

Notice of Allowance mailed Oct. 11, 2011, for related U.S. Appl. No. 12/505,543, filed Jul. 20, 2009.

International Preliminary Examination Report issued Nov. 9, 2010, in International Application No. PCT/US2009/042735.

International Search Report mailed Dec. 17, 2009, in International Application No. PCT/US2009/042735.

International Search Report mailed Jan. 25, 2011, in International Application No. PCT/US2010/038037.

Notice of Allowance mailed Mar. 22, 2012, in U.S. Appl. No. 12/505,543.

Office Action mailed Jun. 25, 2012, in U.S. Appl. No. 12/115,992.

USER INTERFACE FOR INITIATING ACTIVITIES IN AN ELECTRONIC DEVICE

CROSS-REFERENCE TO RELATED APPLICATIONS

The present application is a Continuation of U.S. patent application Ser. No. 12/505,543, filed Jul. 20, 2009 now U.S. Pat. No. 8,159,469, titled "USER INTERFACE FOR INITIATING ACTIVITIES IN AN ELECTRONIC DEVICE," which claims priority as a continuation-in-part of U.S. patent application Ser. No. 12/115,992, filed May 6, 2008, titled "EXTENDED TOUCH-SENSITIVE CONTROL AREA FOR ELECTRONIC DEVICE;" each of which is incorporated herein by reference in its entirety.

FIELD OF THE INVENTION

In various embodiments, the present invention relates to user interfaces for launching applications and other activities in electronic devices, and more particularly to systems and methods for presenting a gesture-based user interface for launching applications and other activities in an electronic device having a touch-sensitive screen.

DESCRIPTION OF THE RELATED ART

Electronic devices for mobile computing and communications are becoming increasingly sophisticated and powerful. Many such devices, including smartphones, personal digital assistants, handheld computers, and the like, are capable of running software applications for performing various tasks. Users interact with such software applications in a manner that is similar to well-known interactions with software applications on personal computers: users can launch and quit applications as needed, and in some cases can even keep two or more applications open concurrently, switching between the open applications as desired. Many such mobile devices include a robust operating system that manages the various applications, memory usage, and other functions and operations of the device. In addition, the operating system often presents a graphical user interface that presents output to the user and receives input from the user.

One increasingly popular type of input/output paradigm for mobile devices is the touch-sensitive screen, or "touchscreen". Touchscreen-enabled devices can provide a robust graphical user interface that allows a user to interact with the device by touching, dragging, and pointing at displayed elements on a touchscreen. Applications can be launched by tapping on an icon from a launch screen. While an application is open, the touchscreen is used to both display output to the user and to accept user input. An example of a mobile device equipped with such a touchscreen is the iPhone, available from Apple Inc. of Cupertino, Calif.

On many such devices, the process of opening an application can be cumbersome at times. Generally, the user launches an application by returning to a home screen, where the user is presented with a number of icons; the user then taps the icon for the application he or she wishes to launch. In some cases, two or more "pages" of applications may be provided, so that the user must scroll to the appropriate page before the desired application can be identified and launched. In addition, applications are often arranged in a non-categorized, non-hierarchical manner, making it more difficult for the user to quickly find the particular one he or she wishes to launch.

Existing devices often fail to provide a mechanism for directly launching an application without first returning to the home screen. Therefore, in many situations, launching an application is a multi-step process that can be distracting, annoying, and/or burdensome for the user. For example, the user must first tap a physical "home" button to the home screen, then locate the icon for the desired application (scrolling to other pages in some cases), and then tap the icon to launch the application.

On some devices, it is known to provide functionality for easier access to the most commonly used applications, for example by providing an area on the screen where icons for these applications can be found, regardless of which of the application launch "pages" is currently being displayed. Such an area can be referred to as a "quick-launch bar" or "dock". However, even for the applications included within the dock, access can be cumbersome, as the user must first return to the home screen before the dock appears. Thus, even for commonly used applications, existing devices fail to provide a quick, easy mechanism for directly launching an application without first returning to the home screen.

What is needed is a mechanism that allows a user to launch applications in an electronic device such as a mobile device, without requiring the user to return to a home screen. What is further needed is a mechanism that allows a user to launch applications directly from virtually any screen, without first returning to a home screen. What is further needed is application launch functionality that avoids the limitations and shortcomings of prior art systems.

SUMMARY

In various embodiments, the system and method of the present invention are implemented in an electronic device such as a mobile device for performing computing and communications functions. The device may be capable of running software applications for performing various functions, and may include the capability to run two or more software applications concurrently. In various embodiments, such software applications may provide the ability to open documents, initiate and/or respond to communications in various forms (such as telephone calls, email messages, instant messages, text messages, and the like), and/or browse web pages or view other online content.

The term "activity" is used herein to refer to a software application, task, document, message, page, image, card, window, content item, or any other construct representing data and/or programmatically definable functionality, and with which the user can interact via a user interface on the electronic device. In various embodiments described herein, activities can be represented by a user interface on a display screen, and a user can interact with activities via an input device.

For purposes of the description provided herein, the terms "application launcher", "launcher", and/or "launch wave" are used interchangeably to refer to functionality for launching activities according to various embodiments of the present invention. The launch wave can be used to open and/or activate applications, documents, tasks, applets, web pages, and/or any other activity; accordingly, the terms "application launcher", "launcher", and/or "launch wave" are not intended to restrict the scope of the claimed invention to the launching of applications. Rather, one skilled in the art will recognize that the techniques described herein can be used for launching, invoking, or initiating any activity, or opening any document or other item.

In one embodiment, a user interface is presented whereby the launch wave of the present invention can be activated at substantially any time, without requiring the user to first return to a home screen. The user can activate the launch wave by performing a gesture, or by pressing a physical button, or by tapping at a particular location on a touchscreen, or by activating a keyboard command. In one embodiment, activation of the launch wave and selection of an item from the launch wave can be performed in one continuous operation on a touch-sensitive screen, so as to improve the expediency and convenience of launching applications and other items.

In one embodiment, the launch wave is not continuously displayed while a user is engaged in interactions with an activity on the screen of the device. However, the user can activate the launch wave while engaged with such an activity, thereby causing the launch wave to appear and providing the user with an opportunity to launch an activity directly using the launch wave. In this manner, the system and method of the present invention improves the user experience and allows users to more easily open applications and other activities with a minimum of disruption and burden.

In one embodiment, the system and method of the present invention operate in connection with a touch-sensitive surface that includes the display screen but also extends beyond the display screen, as described in related U.S. patent application Ser. No. 12/115,992, filed May 6, 2008, for "Extended Touch-Sensitive Control Area for Electronic Device", the disclosure of which is incorporated herein by reference. For example, in one embodiment, the launch wave is activated by a gesture that is performed in the touch-sensitive area outside the display screen, referred to as a "gesture area;" in another embodiment, the launch wave is activated by a gesture that begins in the gesture area and continues into the touch-sensitive display screen. In this manner, as described in more detail below, the user can activate the launch wave using such a gesture, and then select among a plurality of displayed activities in the launch wave, all in a continuous gesture that begins in the gesture area and ends in the display screen.

In one embodiment, the system and method of the present invention are implemented as a visual element that resembles a wave. The user activates the wave by dragging his or her finger from the gesture area onto the touch-sensitive screen, in a particular direction (such as an upward direction). The launcher is displayed as a wave that changes in appearance as the user continues to move his or her finger; hence the term "launch wave" to refer to the user interface element. One skilled in the art will recognize, however, that the term "launch wave" is used herein for ease of nomenclature only; the techniques of the present invention can be implemented with user interface elements having other appearances that do not necessarily resemble a wave.

In one embodiment, while the launch wave is being displayed, vertical motion of the finger causes the wave to follow the vertical position of the finger; for example, the wave may stay just above the position of the finger, so that it is not obscured by the finger. In one embodiment, horizontal motion of the finger causes different items within the launch wave to be highlighted. Various mechanisms for highlighting items in the launch wave are described herein. Once the user's finger position has caused the desired item to be highlighted, the user can activate, or open, the activity associated with the item by moving his or her finger away from the touchscreen, thereby ending the gesture. In one embodiment, the user can cancel the launch wave by returning his or her finger to the gesture area, or otherwise sliding off an edge of the screen, before ending contact with the screen.

In this manner, the system and method of the present invention allow a user to launch an activity directly and without first activating a home screen. In one embodiment, the activity can be launched with a single-handed gesture that is optimized for ambidextrous use. Thus, the system and method of the present invention provide an improved mechanism for launching activities in an electronic device.

In other embodiments, other variations and enhancements can be implemented. For example, in one embodiment, a hierarchical launch wave can be implemented, wherein highlighting of an item in the launch wave causes other, subordinate items to be displayed. The user can navigate among the top-level and subordinate items simply by dragging his or her finger around the screen. The user can select a desired item, either top-level or subordinate, by removing his or her finger from the screen while the desired item is highlighted.

In one embodiment, the techniques described herein can be combined with the card repositioning and/or grouping techniques described in related U.S. patent application Ser. No. 12/416,279, filed Apr. 1, 2009, for "Card Metaphor for Activities in a Computing Device", the disclosure of which is incorporated herein by reference.

The various features described above and herein can be implemented singly or in any combination, as will be apparent to one skilled in the art. Additional features and advantages will become apparent from the description provided below.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

For purposes of the description provided herein, the terms "application launcher", "launcher", and/or "launch wave" are used interchangeably to refer to functionality for launching activities according to various embodiments of the present invention. The launch wave can be used to open and/or activate applications, documents, tasks, applets, web pages, and/or any other activity; accordingly, the terms "application launcher", "launcher", and/or "launch wave" are not intended to restrict the scope of the claimed invention to the launching of applications. Rather, one skilled in the art will recognize that the techniques described herein can be used for launching any activity. In addition, that the term "launch wave" is used herein for ease of nomenclature only; the techniques of the present invention can be implemented with user interface elements having other appearances that do not necessarily resemble a wave.

For purposes of the description provided herein, the following additional terms are defined:

Touch-sensitive surface: a surface of a device that is capable of detecting contact;

Touch-sensitive screen (or touchscreen): a touch-sensitive surface that also functions as a display screen;

Gesture: a touch command that includes a distinctive motion that can be interpreted to specify a command or action to be performed;

Gesture area: a touch-sensitive surface that does not function as a display screen.

System Architecture

In various embodiments, the present invention can be implemented on any electronic device, such as a handheld computer, personal digital assistant (PDA), personal computer, kiosk, cellular telephone, and the like. For example, the invention can be implemented as a user interface for launching software applications and other activities on such a device. Accordingly, the present invention can be implemented as part of an operating system running on such a device.

In various embodiments, the invention is particularly well-suited to devices such as smartphones, handheld computers, and PDAs. One skilled in the art will recognize, however, that the invention can be practiced in many other contexts, including any environment in which it is useful to provide quick access to a user interface element for initiating applications and other activities. Accordingly, the following description is intended to illustrate the invention by way of example, rather than to limit the scope of the claimed invention.

Figure 1:
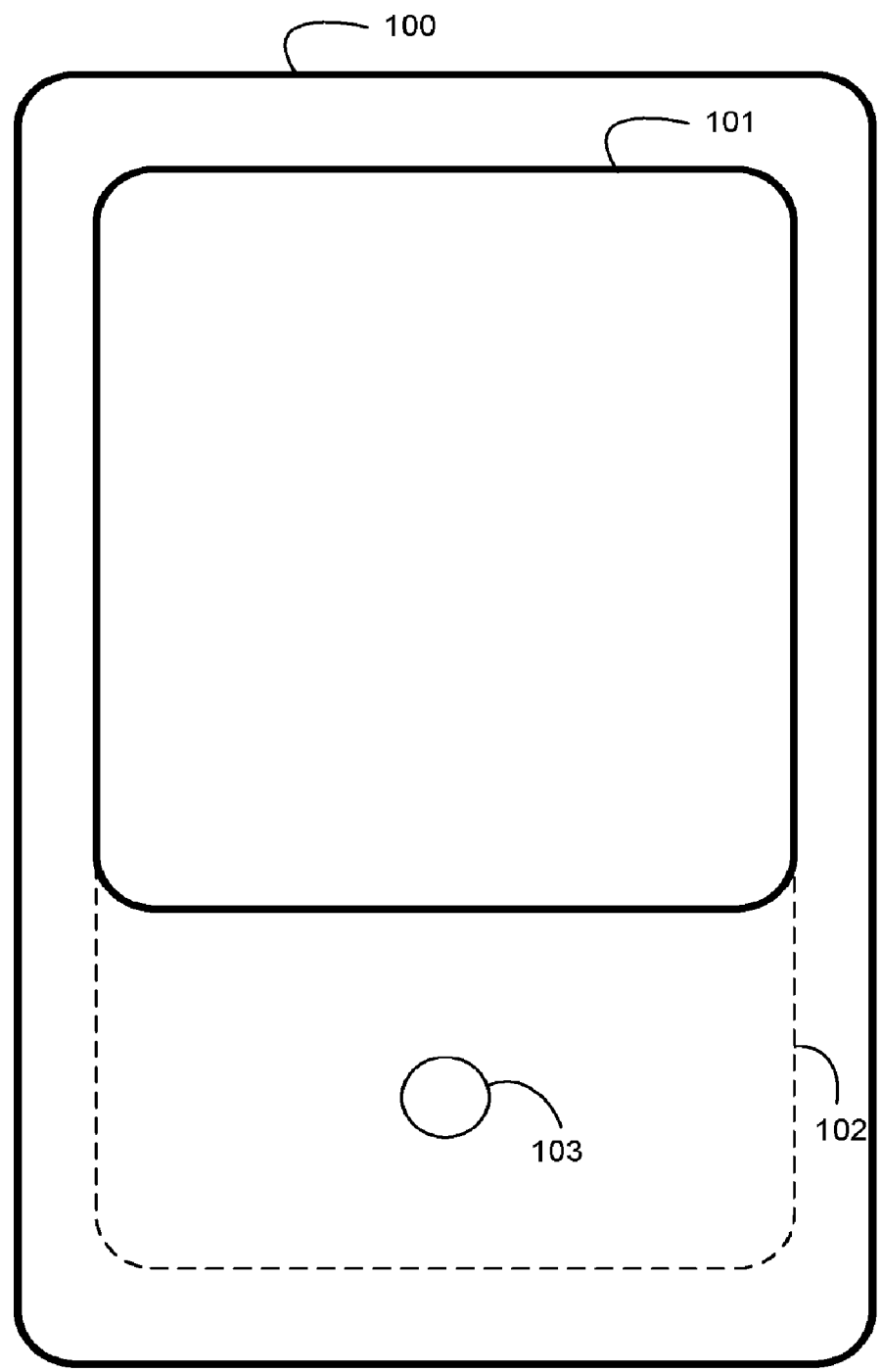
FIG. 1 is an example of a device for implementing the present invention, according to one embodiment.

Referring now to FIG. 1, there is shown an example of an example of a device 100 having a touch-sensitive screen 101 and a gesture area 102, according to one embodiment.

For illustrative purposes, device 100 as shown in FIG. 1 is a personal digital assistant or smartphone. Such devices commonly have telephone, email, and text messaging capability, and may perform other functions including, for example, playing music and/or video, surfing the web, running productivity applications, and the like. The present invention can be implemented in any type of device having a touch-sensitive screen, and is not limited to devices having the listed functionality. In alternative embodiments, the invention can be implemented in devices that do not have touch-sensitive screens but that accept user input in other ways, such as via a trackpad, trackball, rocker switch, joystick, five-way switch, or the like. In addition, the particular layout of device 100 as shown in FIG. 1 is merely exemplary and is not intended to be restrictive of the scope of the claimed invention.

Gesture area 102 is an optional input mechanism for implementing the present invention. As described in more detail below, in one embodiment the launch wave of the present invention is invoked in response to the user performing a gesture that begins in gesture area 102 and continues in an upward direction onto touch-sensitive screen 101. However, it other embodiments the launch wave may be invoked using other commands and is not limited to the particular gesture described herein. Accordingly, in some embodiments, gesture area 102 can be omitted without departing from the essential characteristics of the invention as claimed.

In various embodiments, touch-sensitive screen 101 and gesture area 102 can be implemented using any technology that is capable of detecting a location of contact. One skilled in the art will recognize that many types of touch-sensitive screens and surfaces exist and are well-known in the art, including for example:

capacitive screens/surfaces, which detect changes in a capacitance field resulting from user contact;

resistive screens/surfaces, where electrically conductive layers are brought into contact as a result of user contact with the screen or surface;

surface acoustic wave screens/surfaces, which detect changes in ultrasonic waves resulting from user contact with the screen or surface;

infrared screens/surfaces, which detect interruption of a modulated light beam or which detect thermal induced changes in surface resistance;

strain gauge screens/surfaces, in which the screen or surface is spring-mounted, and strain gauges are used to measure deflection occurring as a result of contact;

optical imaging screens/surfaces, which use image sensors to locate contact;

dispersive signal screens/surfaces, which detect mechanical energy in the screen or surface that occurs as a result of contact;

acoustic pulse recognition screens/surfaces, which turn the mechanical energy of a touch into an electronic signal that is converted to an audio file for analysis to determine position of the contact; and frustrated total internal reflection screens, which detect interruptions in the total internal reflection light path.

Any of the above techniques, or any other known touch detection technique, can be used in connection with the device of the present invention, to detect user contact with screen 101, gesture area 102, or both.

In one embodiment, the present invention can be implemented using other gesture recognition technologies that do not necessarily require contact with the device. For example, a gesture may be performed over the surface of a device (either over screen 101 or gesture area 102), or it may begin over the surface of a device and terminate with a touch on the device (either on screen 101 or gesture area 102). It will be recognized by one with skill in the art that the techniques described herein can be applied to such non-touch-based gesture recognition techniques.

In one embodiment, device 100 as shown in FIG. 1 also has a physical button 103. In one embodiment, physical button 103 can be used to perform some common function, such as to return to a home screen, to activate a selected on-screen item, or to invoke the launch wave of the present invention. Physical button 103 is not needed for the present invention, and is shown for illustrative purposes only. In one embodiment, physical button 103 is touch sensitive, so that the user's gestures as entered in gesture area 102 and/or on screen 101 can be initiated on button 103 and/or can pass over button 103 as well. For purposes of the following description, gesture area 102 will be considered to include button 103 for embodiments where button 103 is touch-sensitive. In one embodiment, such functionality is implemented using techniques described in the above-cited related patent application.

In the example of FIG. 1, gesture area 102 is located immediately below touch-sensitive screen 101, with no gap between screen 101 and gesture area 102. One skilled in the art will recognize that, in various embodiments, gesture area 102 can be provided in any location with respect to screen 101 and need not be placed immediately below screen 101 as shown in FIG. 1. In addition, there may be a gap between gesture area 102 and screen 101, without departing from the essential characteristics of the present invention. Where a gap is present, device 100 may simply ignore the gap when interpreting touch commands that cross over from gesture area 102 to touch-sensitive screen 101, and vice versa.

In various embodiments, gesture area 102 can be visibly delineated on the surface of device 100, if desired, for example by an outline around gesture area 102, or by providing a different surface texture, color, and/or finish for gesture area 102 as compared with other surfaces of device 100. Such delineation is not necessary for operation of the present invention.

Figure 2:
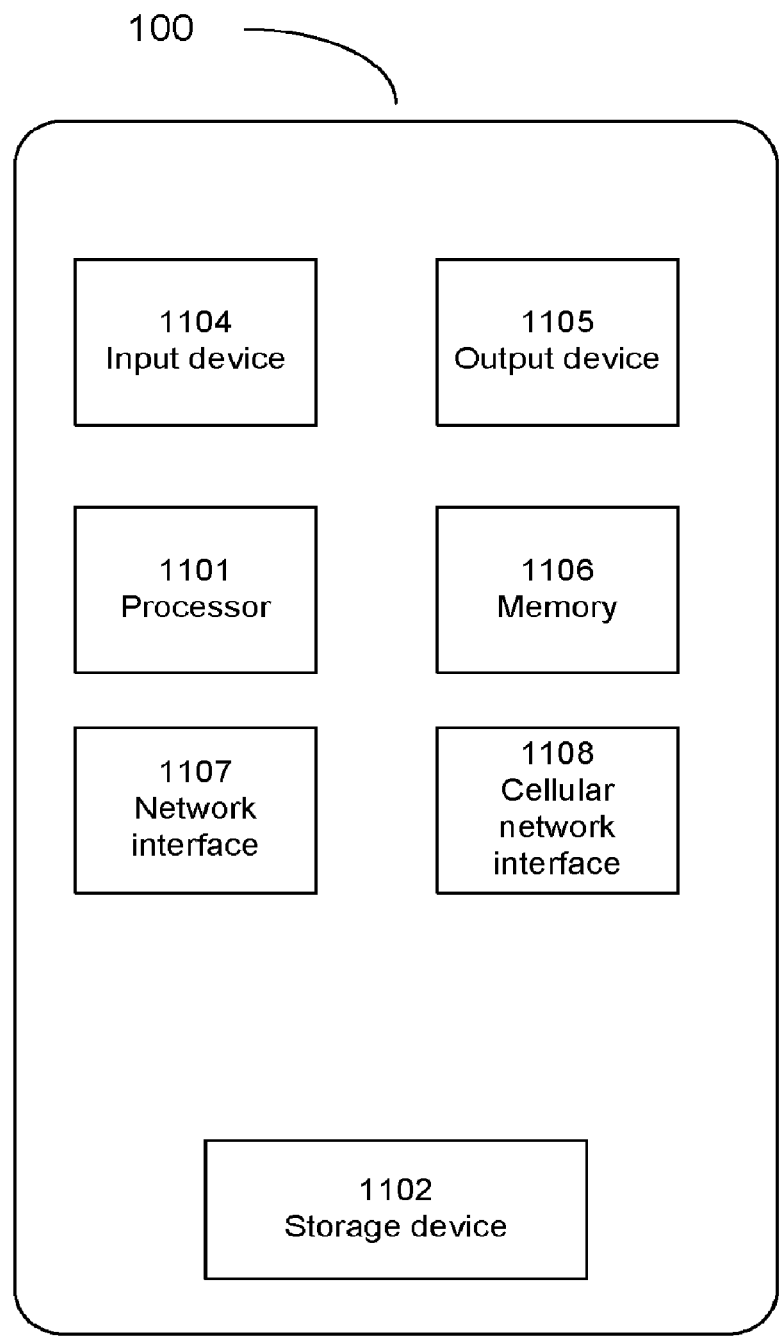
FIG. 2 depicts a functional architecture for presenting a launch wave according to one embodiment of the present invention.

Referring now to FIG. 2, there is shown a functional architecture for presenting a launch wave according to one embodiment of the present invention. Device 100 includes a processor 1101 for performing the steps described herein and for performing other operations related to the operation of device 100, including running software programs and an operating system, and controlling operation of various components of device 100. Device 100 also includes input device 1104 (such as a keyboard, trackball, rocker switch, five-way switch, touch-sensitive pad or screen, or the like), output device 1105 (such as display screen 101), and memory 1106. In some embodiments, input device 1104 and output device 1105 are implemented in combination, as for example the above-described touch-sensitive screen 101 which presents output from the user and also accepts input, for example in the form of direct manipulation and/or activation of displayed user interface elements, as well as gesture input.

Device 100 also includes storage device 1102, which may be a hard drive, flash memory, or any other fixed or removable component for data storage. In various embodiments, device 100 can also include additional components, such as, optionally, network interface 1107 (such as Bluetooth and/or wired connectivity to a network such as the Internet), and/or cellular network interface 1108 providing cellular telephony functionality. It is well known to provide such functionality on smartphones.

One skilled in the art will recognize that the functional architecture depicted in FIG. 2 is merely exemplary, and that other arrangements and components can be used for implementing the present invention. The particular components shown in FIG. 2 are not necessary to practicing the invention as claimed herein; some components may be omitted, and others added, without departing from the essential characteristics of the invention as set forth in the claims.

In one embodiment, the invention can be implemented as a feature of an operating system running on device 100. Accordingly, certain aspects of the present invention can be implemented as part of a graphical user interface for controlling software, including launching applications and other activities, on such device 100.

Launch Wave

Figure 3A:
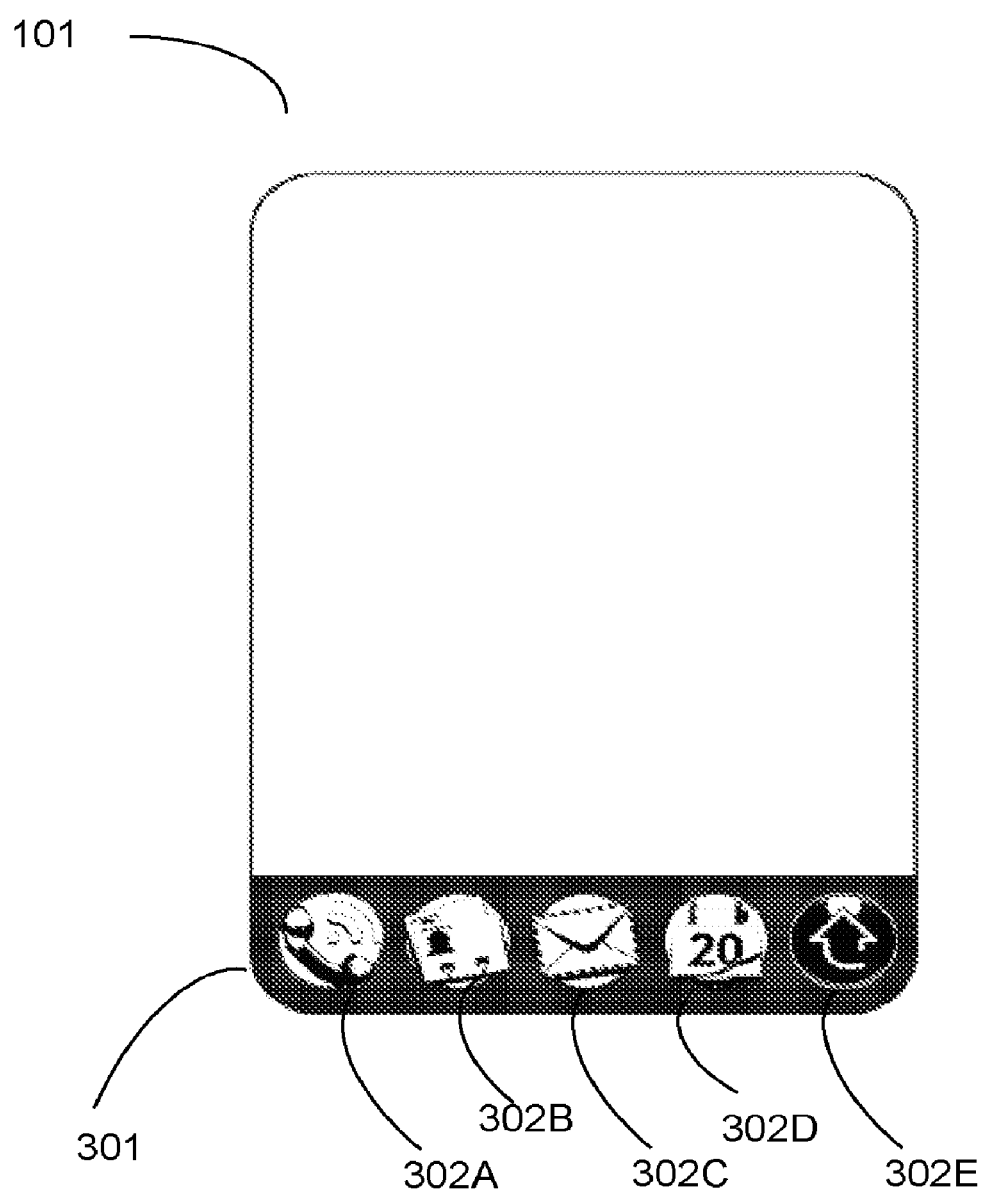
FIG. 3A is a screen shot depicting an example of a home screen including a quick launch bar according to one embodiment.

Referring now to FIG. 3A, there is shown an example of a home screen including a quick launch bar 301, as depicted on display screen 101 according to one embodiment. In one embodiment, this home screen represents an initial state of device 100, from which the user can activate any of several activities represented by items 302A through 302E. In the example, these items 302A through 302E are represented as icons. Tapping on one of the items 302 causes an activity (such as an application) to be launched.

In the example shown in FIG. 3A, item 302A opens a telephone activity; item 302B opens a contact list; item 302C opens an email application; item 302D opens a calendar; and item 302E opens a launch wave for accessing additional activities. In some embodiments, the specific items 302 shown in quick launch bar 301 are user-configurable, so that the user can position items 302 for the most-commonly used activities as he or she sees fit.

Figure 3B:
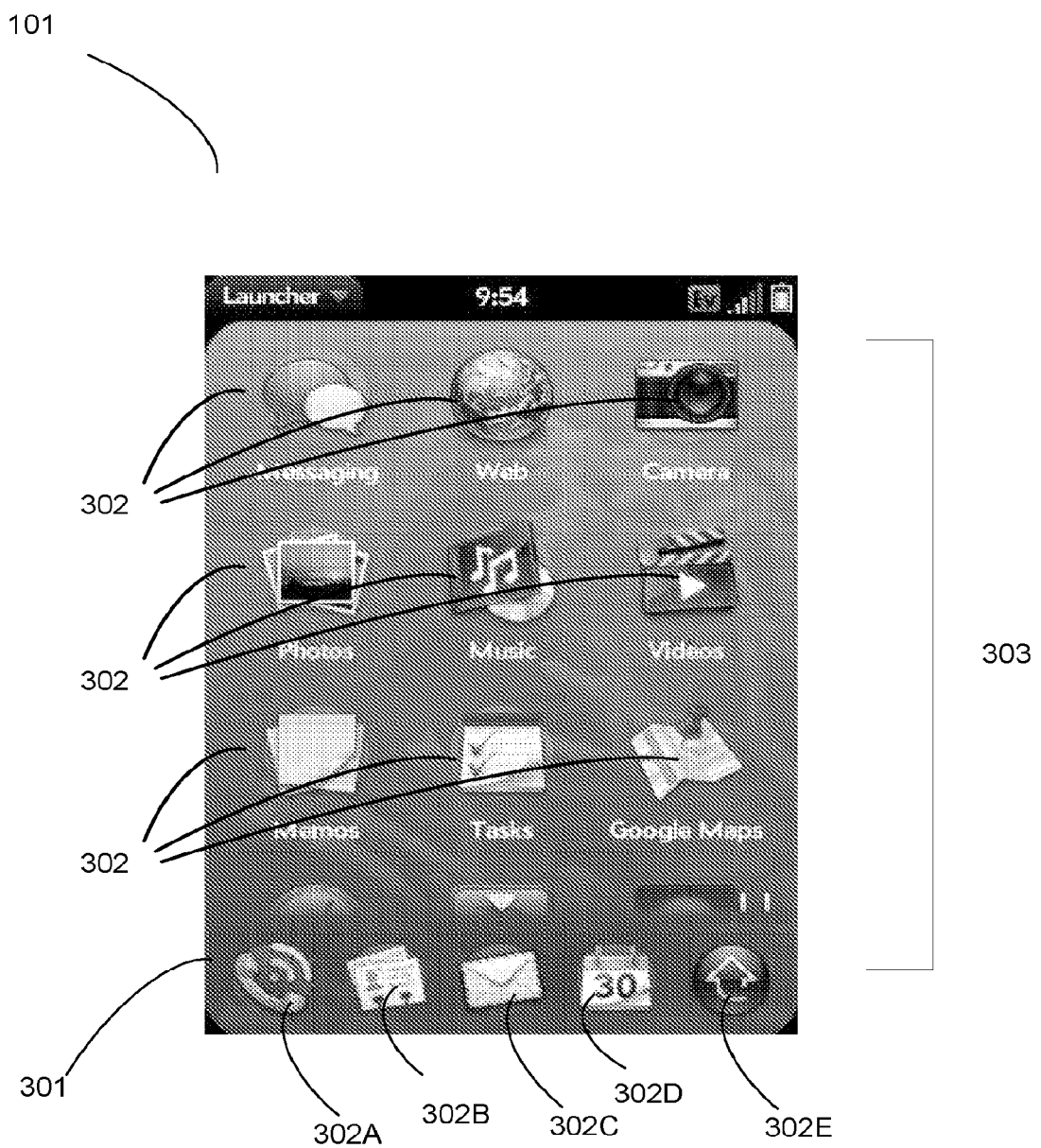
FIG. 3B is a screen shot depicting an example of a launch screen including a quick launch bar according to one embodiment.

In one embodiment, the user can activate item 302E to open a launch screen so as to access additional activities. Referring now to FIG. 3B, there is shown an example of a launch screen 303 according to one embodiment, as depicted on display screen 101. Additional items 302 are shown, along with the same quick launch bar 301 that was depicted in FIG. 3A. In some embodiments, multiple pages of items 302 can be made available via launch screen 303; the user can scroll, for example in a leftward or rightward direction, to see other items 302. In one embodiment, quick launch bar 301 remains at a fixed location, with the same five items 302A through 302E, while user scrolls to see other items 302 in launch screen 303. In this manner, the items 302A through 302E that are most commonly used remain available and easily accessible to the user.

In one embodiment, device 100 is capable of running one or more software applications. In one embodiment, while a software application or other activity is running, quick launch bar 301 is not displayed. In this manner, valuable screen space is preserved so as to maximize the space available to the running activity. If, while an interface for an activity is being displayed, the user wishes to launch another activity, he or she can return to launch screen 303 to select an activity. However, the system and method of the present invention provides a mechanism by which the user can launch an activity while another activity's interface is being displayed, without first returning to launch screen 303. According to various embodiments of the present invention, the user can launch an activity while another activity's interface is being displayed, using a single gesture.

Figure 3C:
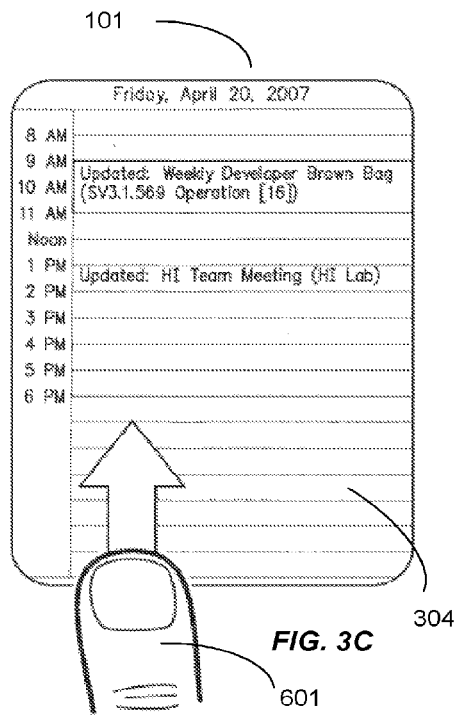
FIG. 3C is a screen shot depicting an example of a gesture for invoking a launch wave from a screen displaying a user interface for an application, according to one embodiment.

Referring now to FIG. 3C there is shown a screen shot depicting an example of a gesture for invoking a launch wave from a screen displaying a user interface 304 for a calendar application, according to one embodiment. In one embodiment, as shown in FIG. 3C, substantially the entire screen 101 is devoted to the user interface 304 for the calendar application. In some embodiments, certain areas of the screen (not shown) can be reserved for status information, such as battery life, clock, and the like.

Figure 4:
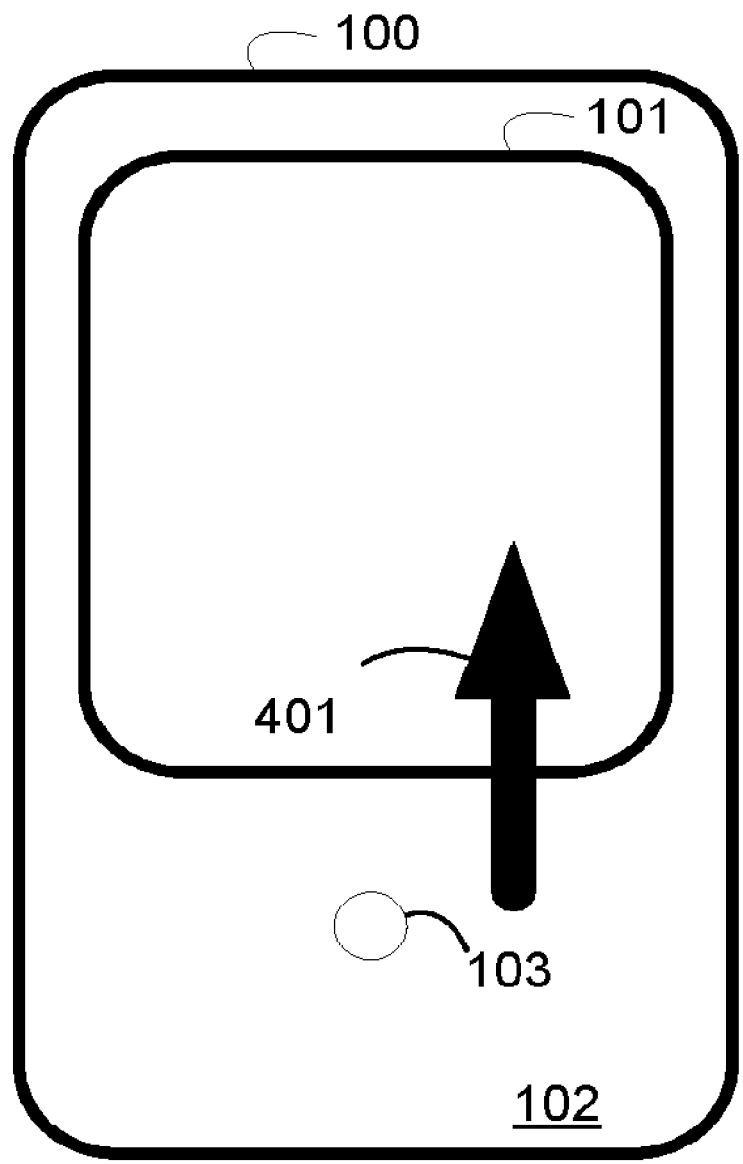
FIG. 4 depicts an example of a gesture that can be used to activate the launch wave of the present invention, according to one embodiment.

FIG. 3C depicts user's finger 601 (or thumb) moving in an upward direction onto screen 101. In one embodiment, such a gesture invokes a launch wave to allow the user to select an activity to launch, as will be described in more detail below. Referring now briefly to FIG. 4, there is shown gesture 401 that can be used to invoke the launch wave of the present invention, according to one embodiment. In the example, gesture 401 is an upward motion that begins in gesture area 102 and continues into screen 101. In one embodiment the launch wave is presented once gesture 401 has extended a sufficient distance beyond the lower edge of screen 101.

Figure 3D:
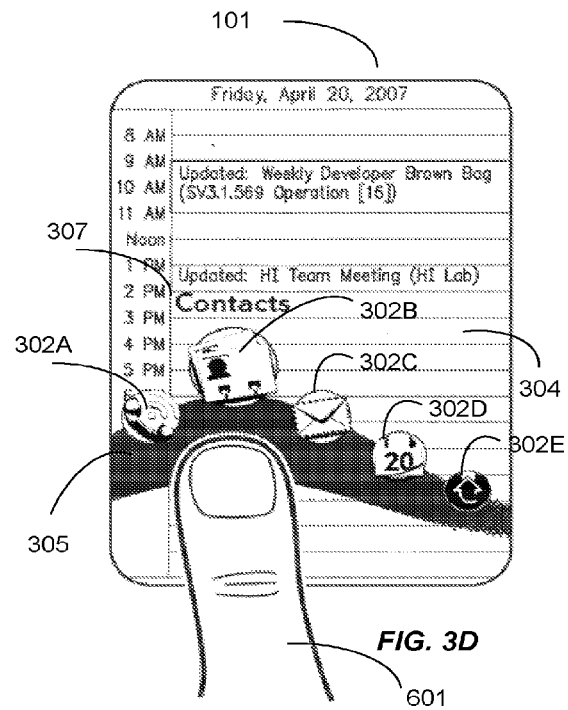
FIGS. 3D through 3F are screen shots depicting an example of a launch wave according to one embodiment.

Referring now to FIG. 3D, there is shown an example of launch wave 305 according to one embodiment, wherein launch wave 305 is overlaid on user interface 304 of a calendar application. This example illustrates the fact that the present invention allows the user to invoke launch wave 305 without leaving the current activity, which in this case is the calendar application. One skilled in the art will recognize that the particular appearance, behavior, and layout of launch wave 305 as depicted in FIG. 3D and as described herein are merely exemplary, and that the invention can be implemented in other ways without departing from the essential characteristics as defined in the claims.

As described above, in one embodiment, the user invokes launch wave 305 by performing a distinctive gesture, such as by dragging a finger in an upward direction, starting within gesture area 102 and continuing to maintain contact with the front surface of device 100 as the finger is dragged upward onto screen 101. To complete the gesture, the user positions his or her finger over the desired item 302 within launch wave 305 and then releases his or her finger when the desired item 302 is highlighted. Thus, the selection of the activity can be made in one continuous motion of the finger, or gesture, beginning in gesture area 102 and ending on screen 101.

In some embodiments, launch wave 305 appears only after the user has dragged the finger beyond a certain point on screen 101, or after the drag distance exceeds some predetermined threshold. In other embodiments, launch wave 305 appears in response to some other user input, such as pressing a button, hitting a key on a keyboard, or performing a distinctive gesture within gesture area 102 and/or on screen 101.

In one embodiment, launch wave 305 is presented as a substantially horizontal wave-like user interface element, as shown in FIG. 3D. Launch wave 305 includes any number of items 302 that can be selected for activation; these items 302 can be represented as icons, text labels, images, or any combination thereof. In one embodiment, each item 302 represents an activity that can be launched or opened, including for example an application, web page, function, document, message, card, window, or the like. The number of items 302 presented in launch wave 305 can be fixed or variable, or can be user-configurable.

In one embodiment, the items 302 that appear in launch wave 305 correspond to the items 302 presented in quick launch bar 301 as depicted in FIG. 3A. In another embodiment, different items 302 can be presented in launch wave 305. In yet another embodiment, the particular items 302 presented in launch wave 305 are context-sensitive, so that different items 302 may be presented depending on the particular activity being performed at the time launch wave 305 is invoked, or based on any other factors. Items 302 can be represented by static icons, images, or text, or by animated or dynamic elements.

In one embodiment, the vertical position of launch wave 305 is determined by the current vertical position of the user's finger 601 with respect to screen 101; as the user moves finger 601 up or down screen 101, launch wave 305 moves to follow the finger movements. In one embodiment, launch wave 305 remains just above the position of the user's finger 601, so as not to be obscured by the user's finger 601. In one embodiment, if the user moves finger 601 so that it is so close to the top edge of screen 101 that launch wave 305 can no longer be displayed above the finger 601, launch wave 305 remains at or near the top edge of screen 101 even if it may then be obscured by the user's finger 601.

In one embodiment, the appearance of launch wave 305 changes depending on the horizontal position of the user's finger 601 with respect to screen 101. Whichever item 302 is closest to the user's finger position is highlighted, for example by being displayed with a distinctive visual appearance as compared with other items 302. For example, the highlighted item may be displayed at a larger size than other items and/or it may be presented with a brighter appearance and/or some other visual effect to distinguish it from other items 302. In addition, a text label 307 may be presented for the currently highlighted item 302, to enable the user to more easily identify the activity associated with the highlighted item 302. As finger 601 moves horizontally across launch wave 305, different items 302 can be highlighted, and text label 307 may be dismissed for non-highlighted items and introduced for the currently highlighted item 302. In other embodiments, text label 307 is presented for all items 302.

Figure 3E:
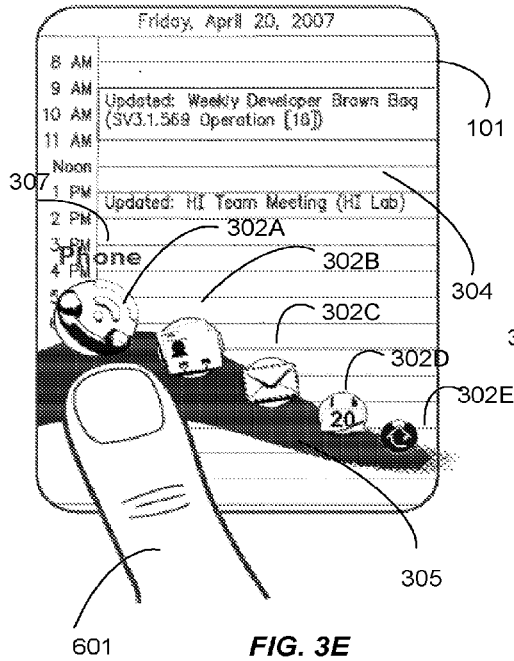
Figure 3F:
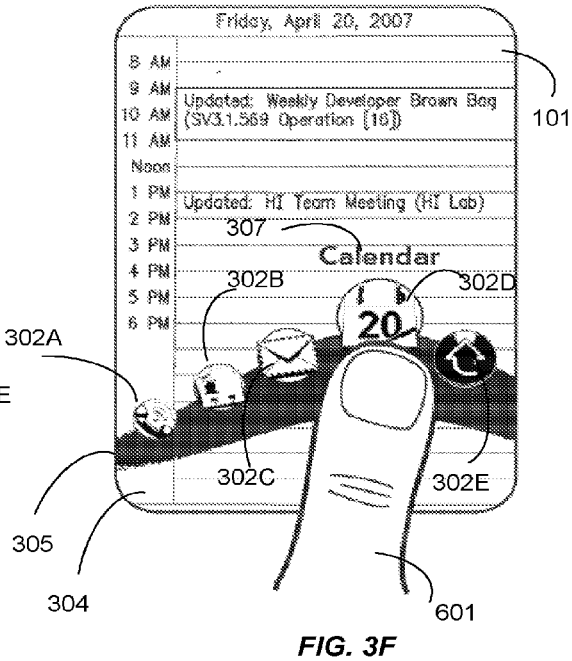

Referring now also to FIGS. 3E and 3F, there are shown examples of the appearance of launch wave 305 as the user moves finger 601 to point to various items 302 within launch wave 305. For example, in FIG. 3D, Contacts item 302B is highlighted by being shown at the highest position and at a larger size. In FIG. 3E, Phone item 302A is highlighted; in FIG. 3F, Calendar item 302D is highlighted. In addition, label 307 is presented for the currently highlighted item in all three FIGS. 3D, 3E, and 3F.

In one embodiment, items 302 gradually increase in size as the user's finger 601 moves closer to them, and decrease in size as the user's finger moves further away. Thus, items 302 grow and shrink in a continuous manner as the user moves finger 601 across screen 101, with the relative size of each item 302 being dependent on its relative distance from the user's finger 601. FIGS. 3D, 3E, and 3F illustrate the changes in relative sizes of items 302 as the user's finger 601 moves horizontally.

In one embodiment, launch wave 305 is presented with a wave-like appearance, having an apex located at or near the user's finger position. Thus, the shape of launch wave 305 provides additional feedback as to the user's finger position, and further emphasizes the currently highlighted item 302 (since that item 302 is presented at a vertical position that is higher than the vertical position of other items). In one embodiment, as the user moves finger 601 to the left or to the right, the apex of launch wave 305 moves to follow finger 601. FIGS. 3D, 3E, and 3F illustrate the changes to the appearance of launch wave 305 and its apex position as the user's finger 601 moves horizontally.

In one embodiment, launch wave 305 is displayed as an overlay atop other items on screen 101. Thus, launch wave 305 can be presented while an application is running, and without disrupting the user's interaction with the application. In various embodiments, launch wave 305 can take different visual forms, and can be presented with a translucent, transparent, or partially translucent or transparent effect. FIGS. 3D, 3E, and 3F illustrate the display of launch wave 305 overlaid on interface 304 for a calendar application.

In one embodiment, the user selects an item 302 from launch wave 305 by removing finger 601 from screen 101 while the item 302 is currently highlighted. This action causes the activity associated with the selected item 302 to be launched, opened, or activated. For example, if the item 302 represents a software application, selection of the item 302 causes the application to be launched. Upon selection of an item 302 from launch wave 305 in this manner, launch wave 305 is dismissed.

In one embodiment, the user can dismiss launch wave 305 without selecting an item 302 and without opening, activating, or launching an activity, by dragging finger 601 back down to gesture area 102 and then removing finger 601 from screen 101. In another embodiment, the user can dismiss launch wave 305 by dragging finger 601 off an edge of screen 101, or close to an edge of screen 101. Other mechanisms may also be provided for dismissing launch wave 305 without opening, activating, or launching an activity.

For illustrative purposes, the operation of launch wave 305 has been described in terms of a user's finger position on screen 101 and contact with screen 101. However, one skilled in the art will recognize that the techniques of the present invention can be implemented using other input paradigms. For example, a user can invoke and manipulate launch wave using a trackball, rocker switch, trackpad, keyboard, keypad, or any other input device. A cursor can be presented on screen 101, for the user to manipulate and move in order to select items from launch wave 305. Thus, the particular implementation described in some detail above, in which user control of launch wave 305 is accomplished using finger movements on a touch-sensitive screen, is intended to be illustrative but not limiting of the scope of the invention as claimed herein.

Figure 3G:
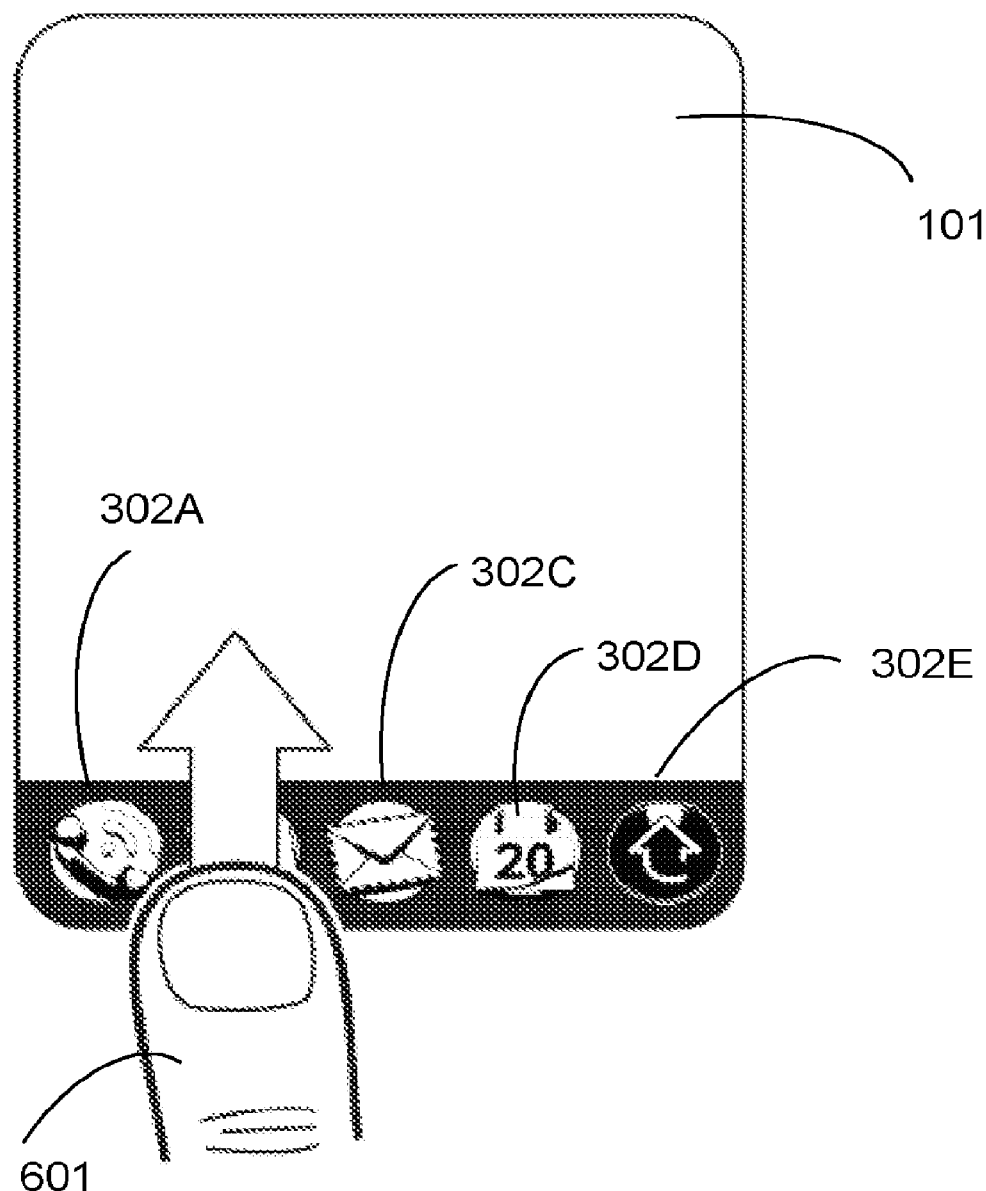
FIG. 3G is a screen shot depicting an example of a gesture for invoking a launch wave from a screen displaying a quick launch bar, according to one embodiment.
Figure 6A:
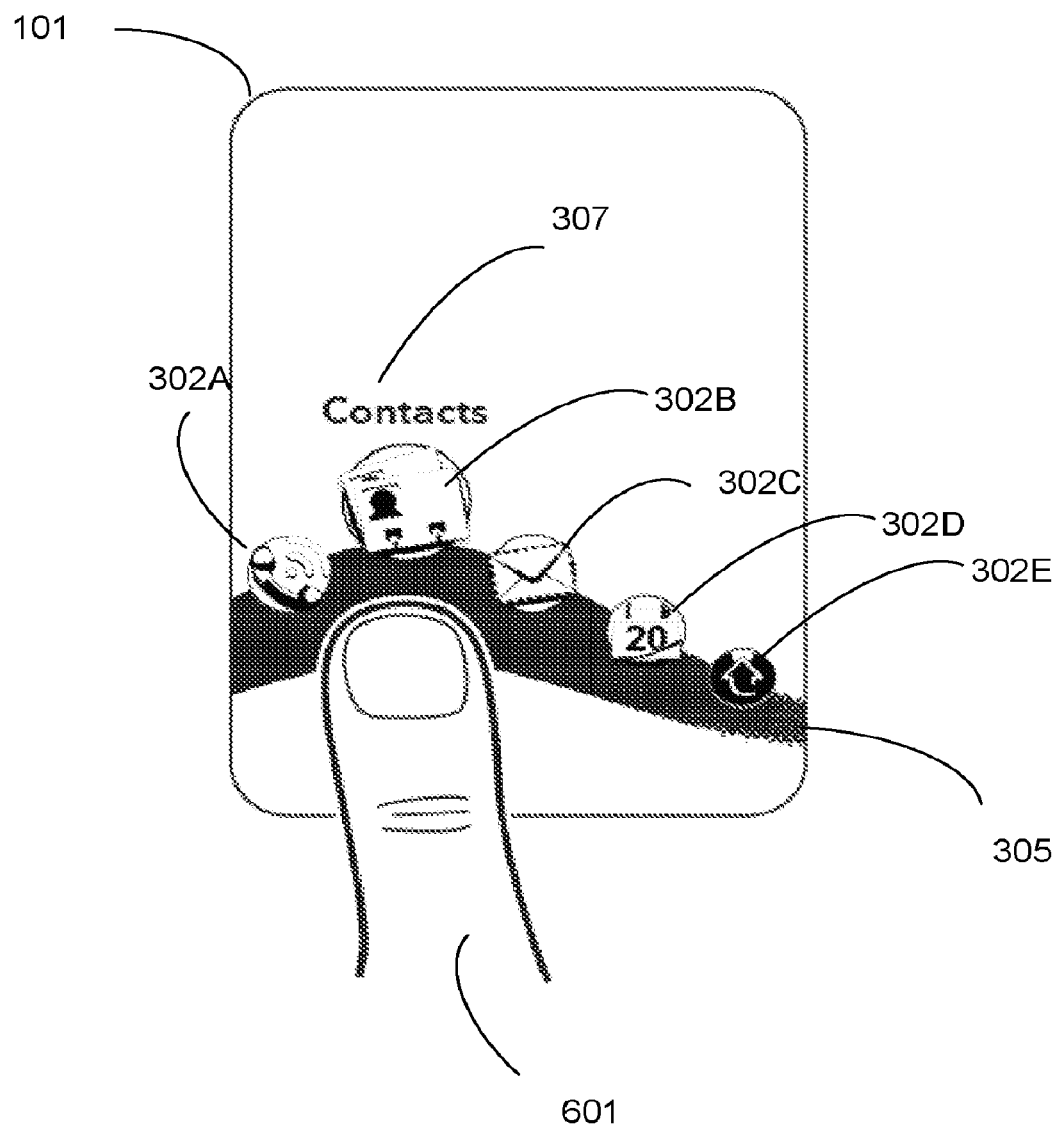
FIGS. 6A through 6C are a series of screen shots depicting an example of the operation of a launch wave according to one embodiment.

As described above, FIGS. 3C through 3F depict an example of launch wave 305 as presented over interface 304 for an activity. However, in one embodiment, launch wave 305 can also be invoked from a launcher screen or other screen. FIG. 3G depicts an example in which the user invokes launch wave 305 while quick launch bar 301 is being displayed. In one embodiment, such an action causes launch wave 305 to temporarily replace launch bar 301. FIG. 6A depicts an example of the displayed launch wave 305 upon user input of the gesture shown in FIG. 3G. In one embodiment, a transition effect is presented so as to create the impression that quick launch bar 301 is being transformed into launch wave 305.

Figure 6B:
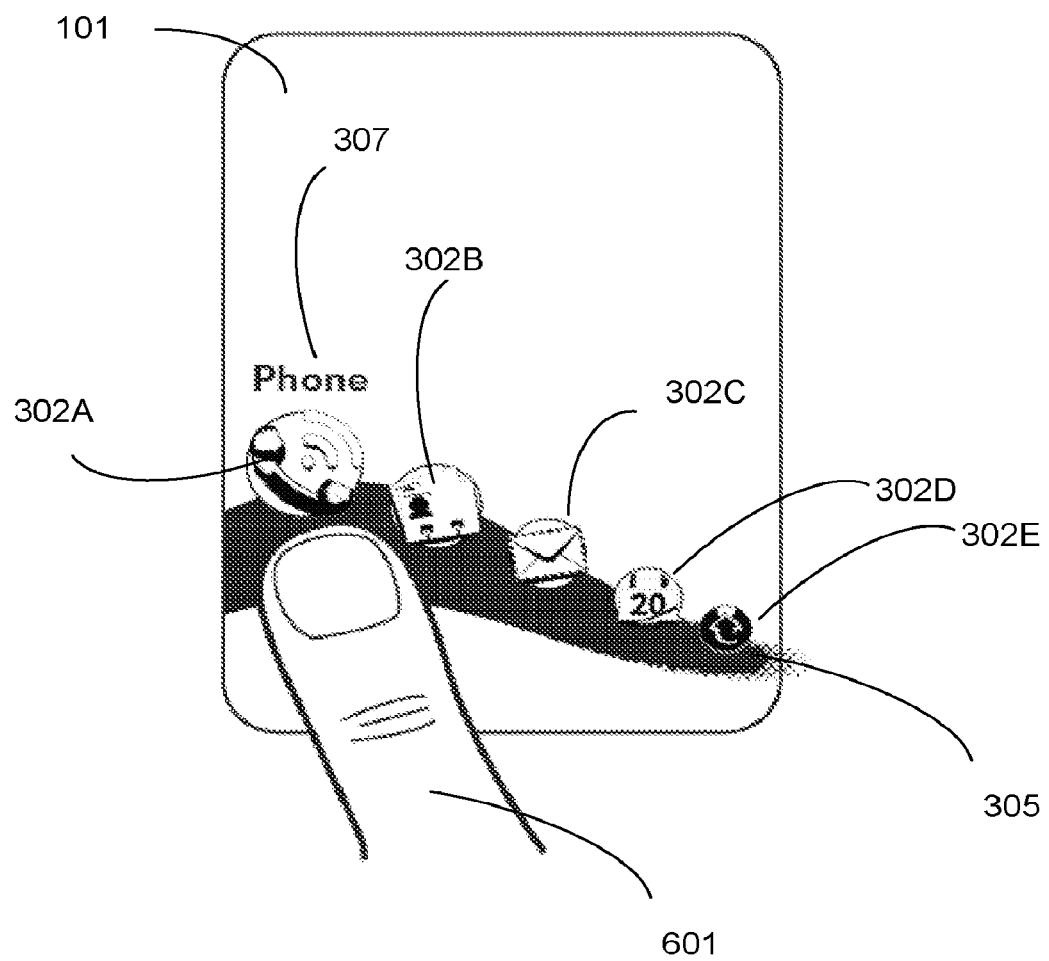
Figure 6C:
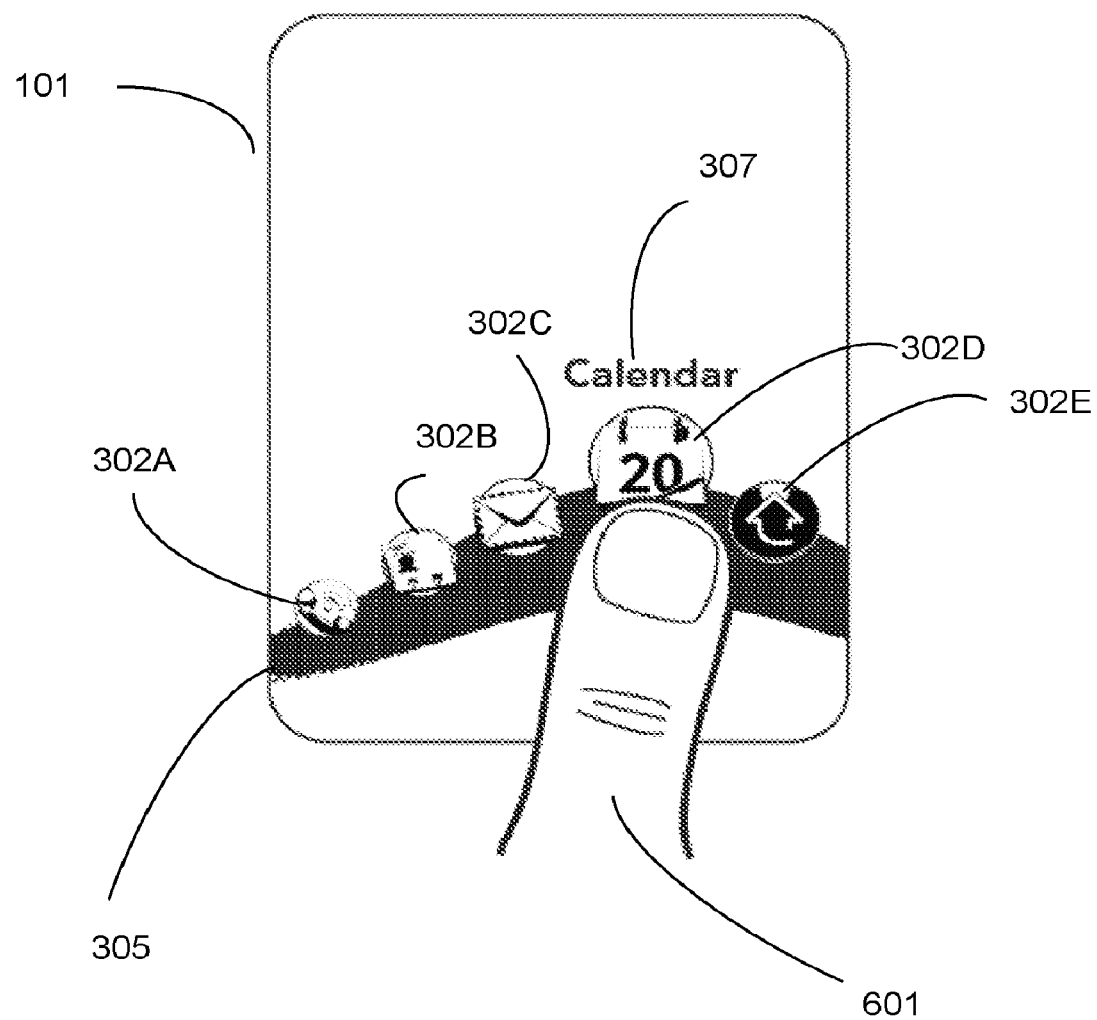

Referring now to FIGS. 6A through 6C, there is shown a series of screen shots depicting an example of the operation of launch wave 305 according to one embodiment. In FIG. 6A, launch wave 305 has been invoked. Launch wave 305 is presented as a substantially horizontal wave-like element, having an apex located near the position of contact of user's finger 601. Contacts item 302B is highlighted because it is the closest item 302 to the position of contact of user's finger 601. In the example, contacts item 302B is highlighted by being displayed at a larger size than other items 302A, 302C, 302D, 302E. In addition, it is shown at a higher vertical position than other items 302A, 302C, 302D, 302E, and text label 307 further describing item 302B is displayed. In the example, non-highlighted items 302A, 302C, 302D, 302E are shown at different sizes depending on their relative distance from the position of contact of user's finger 601.

In FIG. 6B, Phone item 302A is highlighted, and the apex of launch wave 305 has shifted to the left from its previous position. Such a display might be presented, for example, in response to the user moving finger 601 to the left so as to position the point of contact near phone item 302A. Text label 307 for phone item 302A is presented. Relative sizes of items 302 are adjusted based on the new position of the point of contact.

In FIG. 6C, Calendar item 302D is highlighted, and the apex of launch wave 305 has shifted to the right from its previous position. Such a display might be presented, for example, in response to the user moving finger 601 to the right so as to position the point of contact near calendar item 302D. Text label 307 for calendar item 302D is presented. Relative sizes of items 302 are adjusted based on the new position of the point of contact.

As described herein, the user can launch or open an activity corresponding to any item 302 by removing finger 601 from screen 101 while the item 302 is highlighted. In various embodiments, user can dismiss launch wave 305 without launching an activity by sliding finger 601 down the screen to gesture area 102, or by sliding finger 601 off or near the edge of screen 101.

Method

Figure 5:
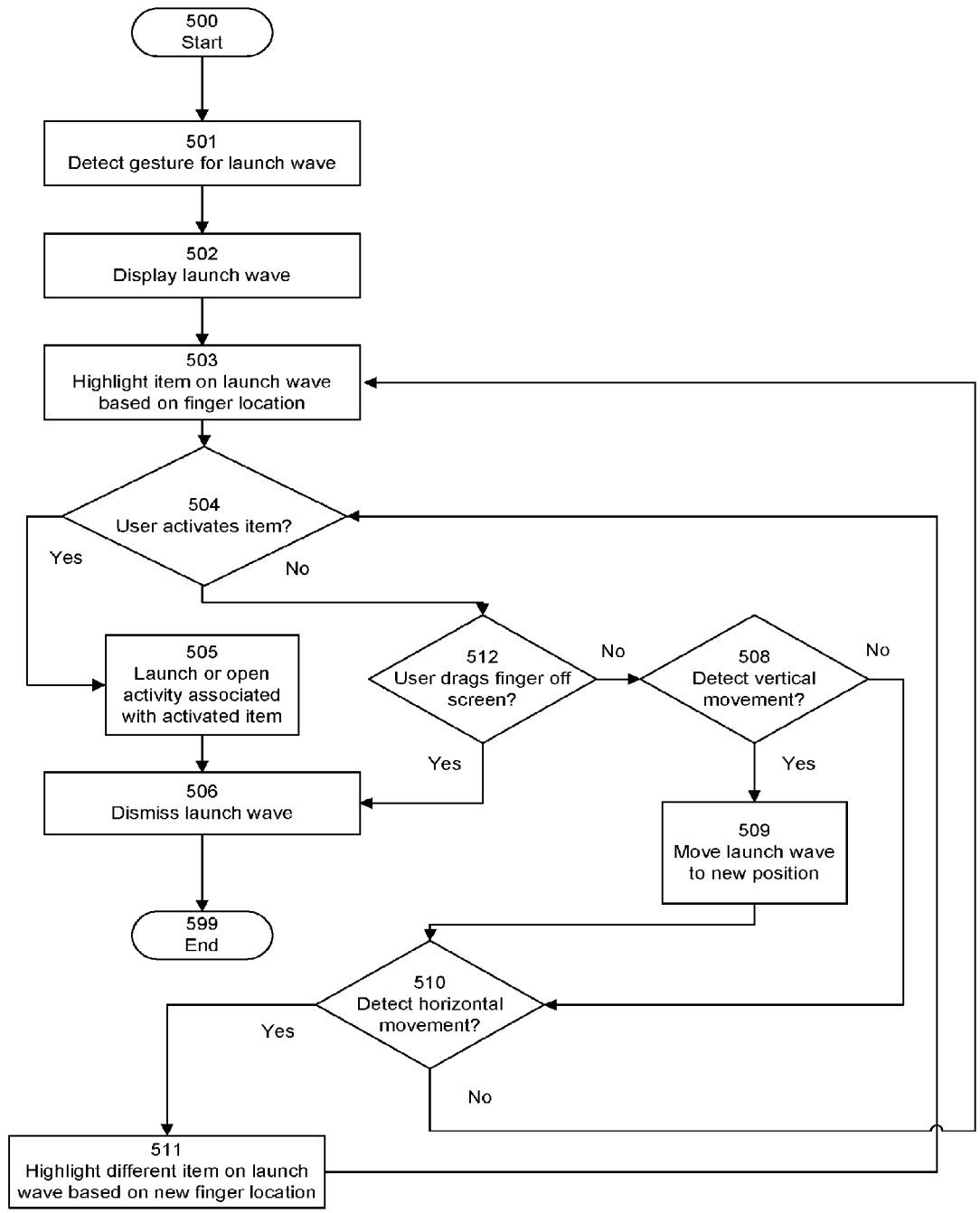
FIG. 5 is a flowchart depicting a method for presenting a launch wave according to one embodiment of the present invention.

Referring now to FIG. 5, there is shown a flowchart depicting a method for presenting launch wave 305 according to one embodiment of the present invention. Device 100 detects 501 gesture 401 or some other user input indicating that launch wave 305 should be invoked. In response to the user input, launch wave 305 is displayed 502 on screen 101. An item 302 in launch wave 305 is highlighted 503, based on the horizontal location of finger 601. As described above, in one embodiment the item 302 closest to the point of contact of finger 601 with screen 101 is highlighted.

A determination is made 504 as to whether the user has activated an item 302. In one embodiment, the user activates an item 302 by removing finger 601 from screen 101 while the desired item 302 is highlighted. In another embodiment, the user hits an Enter key or performs some other command while the desired item 302 is highlighted. In one embodiment, activating the highlighted item 302 results in opening or launching an application, document, or other activity associated with the highlighted item 505. Launch wave 305 is dismissed 506 and the method ends 599.

If, in step 504, the user has not activated an item, a determination is made 512 as to whether the user has dragged finger 601 off screen 101. In one embodiment, such an action indicates the user's intention to dismiss launch wave 305 without activating an item 302. In other embodiments, other commands or actions can be used to cause launch wave 305 to be dismissed. In response to such action, launch wave 305 is dismissed 506 and the method ends 599.

If, in step 512, the user has not attempted to dismiss launch wave 305 by dragging finger 601 off screen 101 or by some other action, a determination is made 508 as to whether the user has moved finger 601 in a vertical direction. If so, launch wave 305 is moved 509 to a new vertical position based on the user's movement of finger 601. As described above, in one embodiment launch wave 305 is positioned so as to be just above finger 601, if possible. If no movement in a vertical direction has taken place, the method proceeds to step 510.

A determination is made 510 as to whether the user has moved finger 601 in a horizontal direction. If so, a different item 302 on launch wave 305 may be highlighted 511 to reflect the horizontal movement. As described above, in one embodiment the item 302 closest to the point of contact is highlighted. In one embodiment, the appearance of launch wave 305 may also change, to move the apex of the wave so that it follows the horizontal position of finger 601. In one embodiment, items 302 may change in size as described above. In one embodiment, all such changes are performed continuously, so as to avoid jarring or sudden changes to the display. After step 511 has been performed, the method returns to step 504 to determine whether the user has activated an item 302.

If no movement in a horizontal direction has taken place, the method returns to step 503 wherein the previously highlighted item 302 continues to be highlighted.

Although the description provided herein sets forth an example in which horizontal movement highlights different items 302, while vertical movement moves launch wave 305 on screen 101, one skilled in the art will recognize that the directions of operation may be changed. For example, in other embodiments, vertical movement can highlight different items 302, while horizontal movement moves launch wave 305. Such an arrangement may be implemented, for example, in connection with a launch wave 305 having a substantially vertical orientation. Other combinations of motions and effects can also be implemented without departing from the essential characteristics of the present invention.

In general, in one embodiment, a position of finger 601 on screen 101 can be expressed in terms of two-dimensional coordinate system. A first coordinate along a first axis specifies the vertical position of launch wave 305, while a second coordinate along a second, orthogonal axis specifies which item 302 within launch wave 305 is highlighted.

In addition, references herein to the user's finger 601 are merely exemplary. In various embodiments, the user can point to areas on screen 101 using a finger, thumb, stylus, pen, or any pointing device. In other embodiments, the user can use a pointing device (such as a mouse, trackpad, trackball, keyboard, five-way switch, or the like) to move an on-screen cursor in order to perform the operations described herein. Thus, the particular descriptions in which reference is made to the user's finger 601 are not intended to limit the scope of the present invention to one particular embodiment.

Scrollable Launch Wave

In one embodiment, any number of items 302 can be included in launch wave 305. If desired, launch wave 305 can be scrollable, so as to facilitate presentation of more items 302 than can reasonably fit on screen 101 at any given time. In an embodiment where a scrollable launch wave 305 is implemented, if the user drags finger 601 to near edge of screen 101 beyond the rightmost or leftmost item 302, launch wave 305 scrolls to cause additional items 302 to be displayed. Items within launch wave 305 may shift position to make room for newly displayed items 302.

For example, in one embodiment wherein a scrollable launch wave 305 is implemented, if the user drags finger 601 near rightmost edge of screen 101 beyond the rightmost item 302, additional items 302 appear at the rightmost edge of launch wave 305. Items 302 within wave 305 are shifted to the left, and the leftmost displayed item(s) 302 may be removed from wave 305.

In some embodiments, scrolling is performed smoothly, for example by introducing new items 302 at a small size and causing them to grow and/or fade-in in a continuous fashion. Similarly, items being dismissed can shrink and/or fade out in a continuous fashion. One skilled in the art will recognize that other techniques can be employed for implementing a scrollable launch wave 305.

Hierarchical Launch Wave

In one embodiment, a hierarchical launch wave can be implemented. Some or all of the items 302 in launch wave 305 can have subordinate items 302, so that the user can navigate a hierarchy of selectable items 302 and thereby have access to a larger number of activities that can be launch via launch wave 305. In addition, the hierarchical arrangement allows items 302 to be organized in a fashion that makes it easier for a user to quickly locate a desired item 302. Any number of levels of the hierarchy can be established, so that subordinate items 302 can themselves have additional subordinate items 302, to any desired degree.

For example, in one embodiment, the initial presentation of launch wave 305 includes top-level items 302, and subordinate items 302 for each displayed top-level item 302 are displayed when the user causes one of the top-level items 302 to be highlighted. In one embodiment, the user can activate a top-level item 302 by simply moving finger 601 away from the screen, or can cause individual subordinate items 302 to be highlighted by moving finger 601 towards those items 302.

In one embodiment, subordinate items 302 are displayed after the user has held finger 601 to highlight a particular top-level item 302 for some period of time. In another embodiment, subordinate items 302 are displayed if the user moves finger 601 in an upward direction by at least some threshold amount while a top-level item 302 is highlighted. In another embodiment, subordinate items 302 are displayed if the user presses on display 301 with at least some threshold amount of force. In either case, the subordinate items 302 for the highlighted item 302 are displayed and the user can then move finger 601 to highlight the subordinate items 302. In one embodiment, the user can "back out" of a level of subordinate items 302 by moving his finger downwards by at least some threshold amount; this causes the subordinate items 302 to be dismissed, and allows the user to again highlight different top-level items 302.

Any number of levels can thereby be implemented. In one embodiment, upward movement causes an additional level of subordinate items 302 to be displayed, if available; downward movement causes the lowest displayed level of subordinate items 302 to be dismissed, unless no subordinate items 302 are currently displayed. Horizontal movement causes different items 302 within the lowest displayed level to be highlighted. One skilled in the art will recognize that this particular description, with its references to horizontal, vertical, upward, and downward movement, is merely exemplary, and that other configurations and directions of movement can be implemented.

In one embodiment, activation of an item 302 at any level takes place in the same manner as described above; in one embodiment, the user removes finger 601 from display 101 while the desired item 302 is highlighted. In various embodiments, the user can also dismiss launch wave 305 by sliding finger 601 downward off screen 101, or off an edge of screen 101.

In one embodiment, some top-level items 302 may not be activatable, but their subordinate items 302 may be activatable. In other embodiments, items 302 at all levels can be activatable. In one embodiment, non-activatable items 302 can have a distinctive visual appearance to emphasize that they represent categories of items 302 and are not themselves activatable.

Figure 8A:
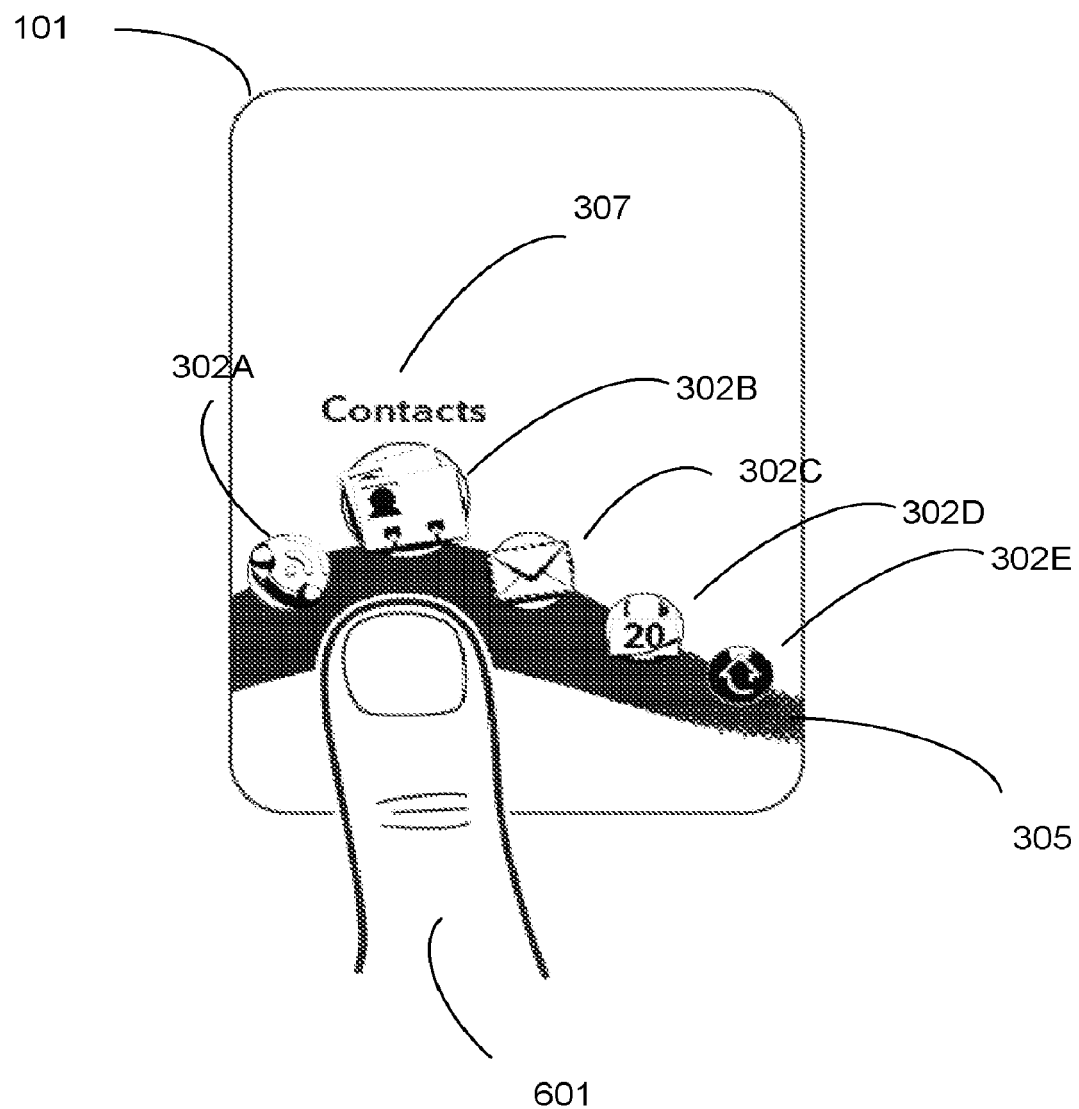
FIGS. 8A through 8C are a series of screen shots depicting an example of the operation of a hierarchical launch wave according to one embodiment.
Figure 8B:
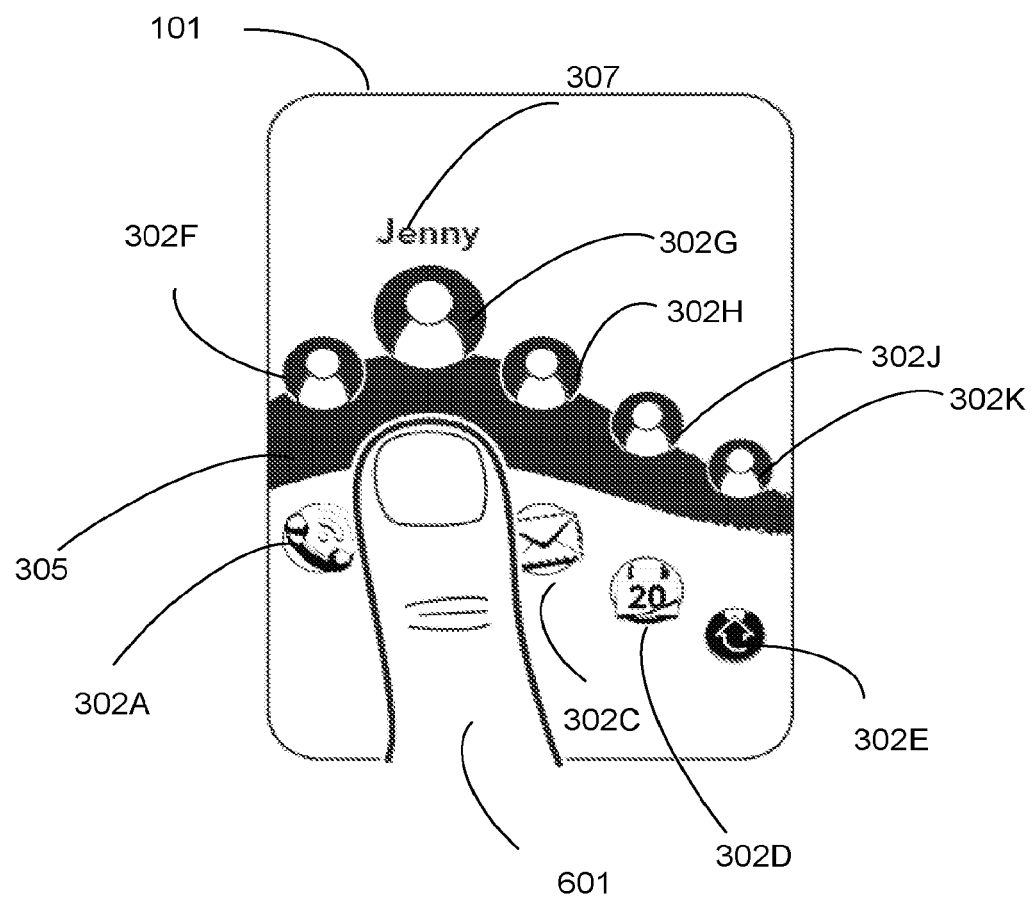
Figure 8C:
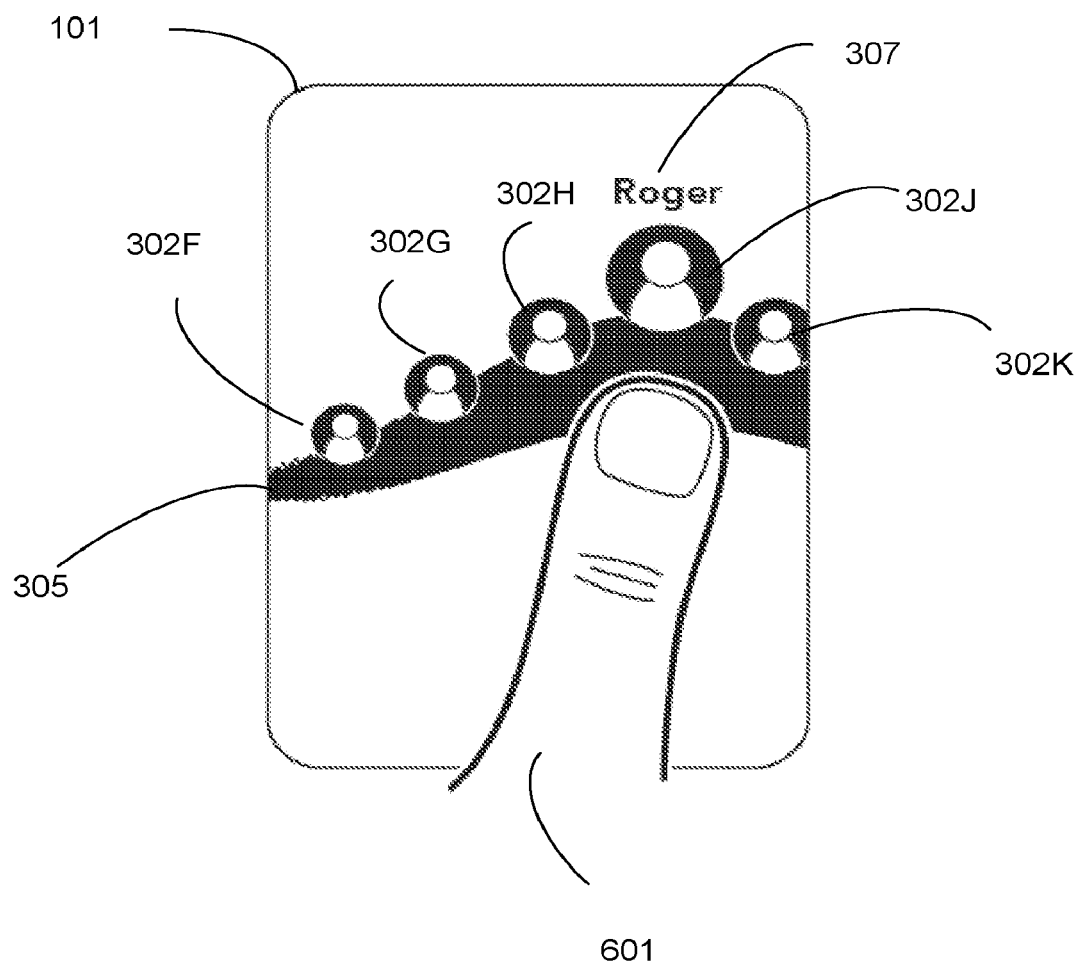

Referring now to FIGS. 8A through 8C, there is shown a series of screen shots depicting an example of the operation of a hierarchical launch wave 305 according to one embodiment. In this example, a contacts item 302B appears within the top level. Highlighting contacts item 302B and activating it causes a contacts activity to open. Highlighting contacts item 302B and continuing to move finger 601 in an upward direction (or holding finger 601 over contacts item 302B to cause it to remain highlighted for some period of time) causes subordinate items 302F through 302K for individual contacts to be displayed. In this manner, the user can navigate directly to an individual contact record by highlighting and activating one of the displayed subordinate items 302F through 302K. Thus, initial invocation of launch wave 305, navigation to the desired item 302, and activation of item 302 can all be performed in a single continuous gesture.

FIG. 8A depicts hierarchical launch wave 305 as initially presented in response to the user moving finger 601 upwards from gesture area 102 onto screen 101. Top-level items 302A through 302E are displayed, including contacts item 302B (and its associated text label 307), which is associated with subordinate items.

In FIG. 8B, the user has caused subordinate items 302F through 302K to be displayed. In one embodiment, subordinate items 302F through 302K are displayed in response to the user continuing to move finger 601 upward. In another embodiment, subordinate items 302F through 302K are displayed in response to the user continuing to cause contact item 302B to be highlighted for some period of time. In one embodiment, subordinate items 302F through 302K represent individual contact records for different people. Contact item 302G is highlighted, and its text label 307 is shown, since that item 305G is closest to the point of contact of user's finger 601.

In FIG. 8C, the user has moved finger 601 in a horizontal direction, causing a different contact item 302J to be highlighted. Here, contact item 302J is highlighted, and its text label 307 is shown, since that item 305G is closest to the point of contact of user's finger 601.

In one embodiment, while the user is navigating among subordinate items 302F through 302K, top-level items 302A through 302E continue to be displayed, as shown in FIG. 8B. In one embodiment, they may be shown at a smaller size, or grayed-out, or in some other visually subdued or distinctive manner with respect to subordinate items 302F through 302K. In this manner, the system of the present invention provides a visual indication emphasizing that the user is currently navigating through subordinate items 302F through 302K rather than through top-level items 302A through 302E. In another embodiment, the appearance of top-level items 302A through 302E does not change when the user is navigating through subordinate items 302F through 302K. In yet another embodiment, top-level items 302A through 302E are shown below launch wave 305 while the user is navigating through subordinate items 302F through 302K, as depicted in FIG. 8B.

In yet another embodiment, as shown in FIG. 8C, while the user is navigating through subordinate items 302F through 302K, top-level items 302A through 302E are not displayed. The user can cause top-level items 302A through 302E to be displayed by moving finger 601 downwards so as to dismiss subordinate items 302F through 302K.

Any of the above-described configurations can be extended to multiple-level hierarchies, with successive levels of subordinate items 302 being displayed and/or dismissed as appropriate.

Figure 7A:
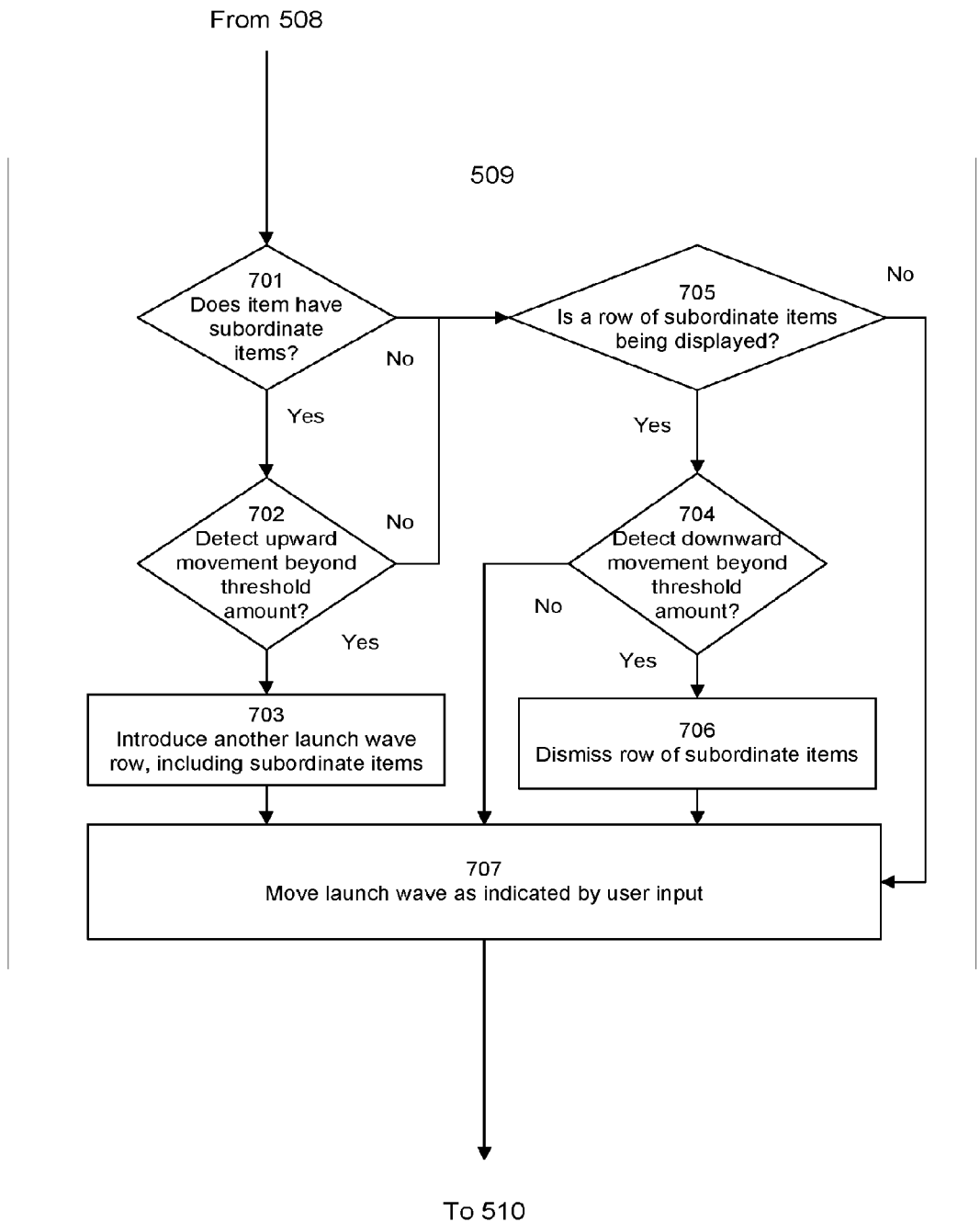
FIG. 7A is a flowchart depicting a method for presenting a hierarchical launch wave according to one embodiment of the present invention.

Referring now to FIG. 7A, there is shown a method for presenting a hierarchical launch wave 305 according to one embodiment of the present invention. In one embodiment, the steps depicted in FIG. 7A are performed as part of step 509 as described above in connection with FIG. 5. Thus, in one embodiment, hierarchical launch wave 305 is implemented using the general method described above in connection with FIG. 5, with the addition of steps 701 though 707 as depicted in FIG. 7A.

As described above, in step 508 a determination is made as to whether the user has moved his or finger in a vertical direction. If so, a determination is made 701 as to whether the currently highlighted item 302 has any subordinate items and as to whether 702 the user has moved finger 601 in an upward direction beyond a threshold amount. The threshold amount can be any amount, including zero movement. If the currently highlighted item 302 has any subordinate items and the user has moved finger 601 in an upward direction beyond the threshold amount, a row of subordinate items 302 is introduced 703. In addition, if appropriate, launch wave 305 is moved 707 as indicated by the user input.

If, in step 701, the currently highlighted item 302 has no subordinate items, or if in step 702, the user has not moved finger 601 in an upward direction beyond the threshold amount, the method proceeds to step 705 to determine whether to dismiss any subordinate items 302. A determination is made 705 as to whether any subordinate items 302 are being displayed, and as to whether 704 the user has moved finger 601 in a downward direction beyond a threshold amount. The threshold amount can be any amount, including zero movement. The threshold amount for downward movement may be the same or different than the threshold amount for upward movement. If subordinate items 302 are being displayed and the user has moved finger 601 in a downward direction beyond the threshold amount, at least one row of subordinate items 302 is dismissed 706. In addition, if appropriate, launch wave 305 is moved 707 as indicated by the user input.

If, in step 705, no subordinate items 302 are being displayed, of if, in step 704, the user has not moved finger 601 in a downward direction beyond the threshold amount, the method proceeds to step 707 to move launch wave 305 as indicated by the user input.

As indicated above, in other embodiments, the user need not move finger 601 upward to cause subordinate items 302 to be displayed. In some embodiments, the user can cause subordinate items 302 to be displayed by holding finger 601 on or near an item 302 having subordinate items 302. After some predetermined period of time, the subordinate items 302 are displayed.

Figure 7B:
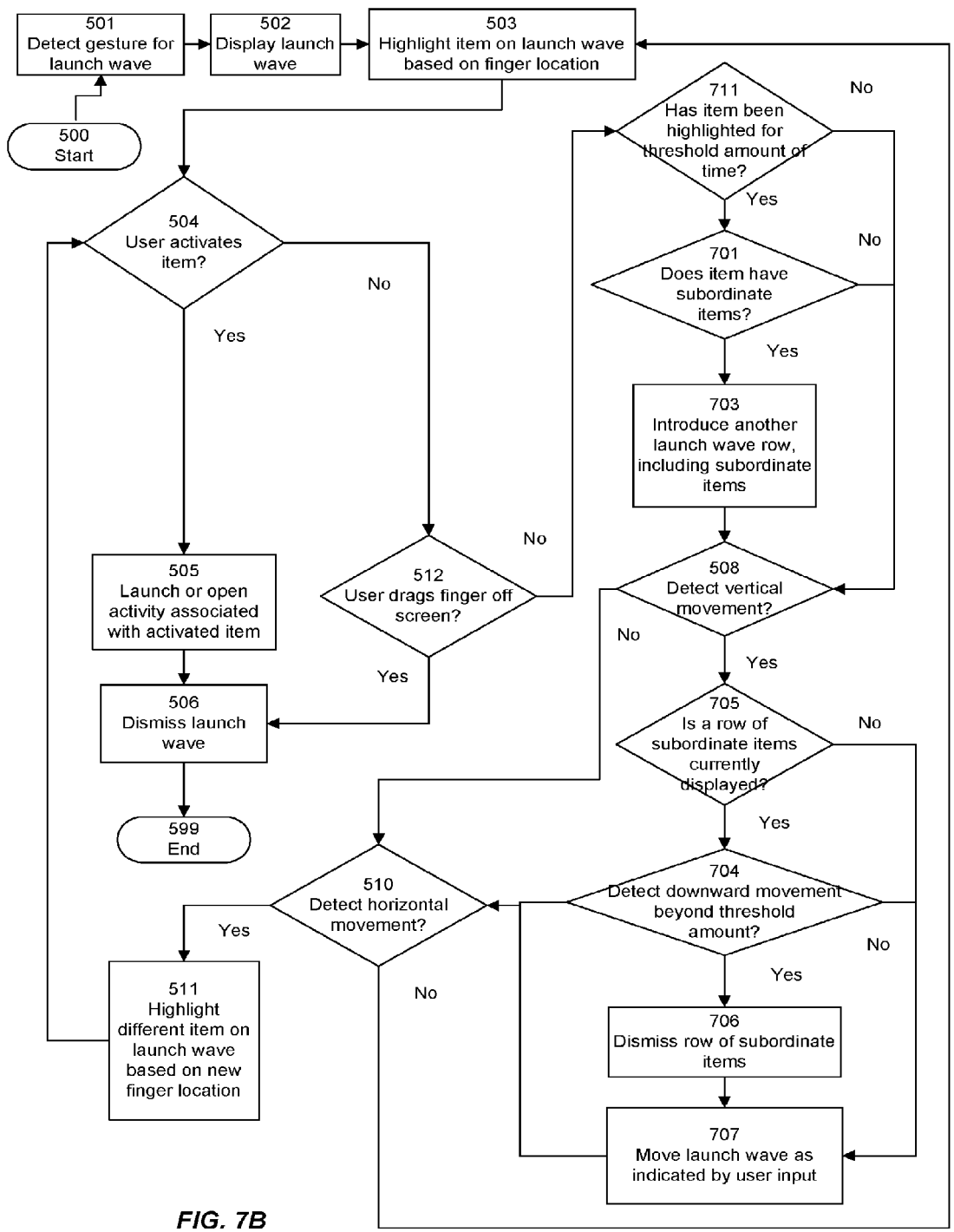
FIG. 7B is a flowchart depicting a method for presenting a hierarchical launch wave according to another embodiment of the present invention.

Referring now to FIG. 7B, there is shown a flowchart depicting a method for presenting a hierarchical launch wave 305 according to an embodiment of the present invention wherein subordinate items 302 are displayed in response to the user holding finger 601 on or near an item 302. Steps 501 through 506 and step 512 are performed as described above in connection with FIG. 5. If, in step 512 the user has not attempted to dismiss launch wave 305 by dragging finger 601 off screen 101 or by some other action, a determination is made 711 as to whether an item 302 has been highlighted for at least some threshold amount of time (such as, for example 0.5 seconds, although any length of time can be used, including 0 seconds). If so, a determination is made 701 as to whether the currently highlighted item 302 has any subordinate items.

If an item 302 has been highlighted for at least some threshold amount of time, and the item 302 has any subordinate items, a row of subordinate items 302 is introduced 703. If no item 302 has been highlighted for at least some threshold amount of time, or if the item 302 does not have any subordinate items, the method proceeds to step 508.

A determination is made 508 as to whether the user has moved his or finger in a vertical direction. If so, a determination is made 705 as to whether any subordinate items 302 are being displayed, and as to whether 704 the user has moved finger 601 in a downward direction beyond a threshold amount. The threshold amount can be any amount, including zero movement. If subordinate items 302 are being displayed and the user has moved finger 601 in a downward direction beyond the threshold amount, at least one row of subordinate items 302 is dismissed 706. In addition, if appropriate, launch wave 305 is moved 707 as indicated by the user input.

If, in step 508, the user has not moved his or finger in a vertical direction, the method proceeds to step 510.

A determination is made 510 as to whether the user has moved his or finger in a horizontal direction. If so, a different item 302 on launch wave 305 may be highlighted 511 to reflect the horizontal movement. As described above, in one embodiment the item 302 closest to the point of contact is highlighted. In one embodiment, the appearance of launch wave 305 may also change, to move the apex of the wave so that it follows the horizontal position of the user's finger. In one embodiment, items 302 may change in size as described above. In one embodiment, all such changes are performed continuously, so as to avoid jarring or sudden changes to the display. After step 511 has been performed, the method returns to step 504 to determine whether the user has activated an item 302.

If no movement in a horizontal direction has taken place, the method returns to step 503 wherein the previously highlighted item 302 continues to be highlighted.

One skilled in the art will recognize that many other variations are possible. For example, the determination in step 711 as to whether to display subordinate items 302 can be based on how long an item 302 has been highlighted, and/or how hard the user has pressed on screen 101, and/or whether the user has performed a distinctive gesture to display subordinate items 302. Any other suitable mechanism can be used for determining that subordinate items 302 should be displayed. Similarly, other mechanisms can be provided for determining whether subordinate items 302 should be dismissed.

In another embodiment, a hierarchical launch wave 305 can be implemented so that, in response to a trigger event, a grid of items 302 is presented in a hierarchical arrangement. Thus, the initial presentation of launch wave 305 can include some subset of available items 302. Then, if the user holds a finger 601 over a particular item 302, or moves finger 601 in an upward direction while a particular item 302 is highlighted, or performs some other distinctive gesture, display 101 can show a hierarchically-arranged grid of items 302 related to the highlighted item 302. The user can then move finger 601 to navigate within the grid.

Figure 9A:
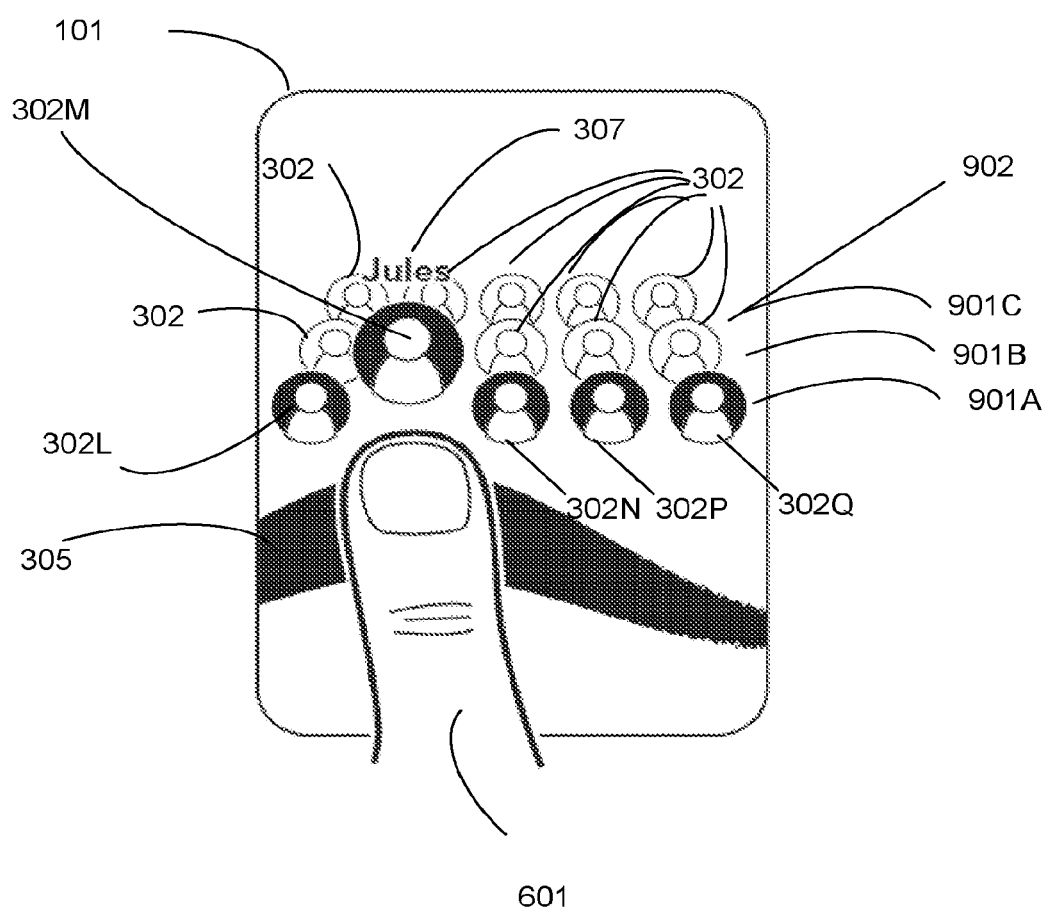
FIGS. 9A and 9B are a series of screen shots depicting an example of a grid layout for a hierarchical launch wave according to one embodiment
Figure 9B:
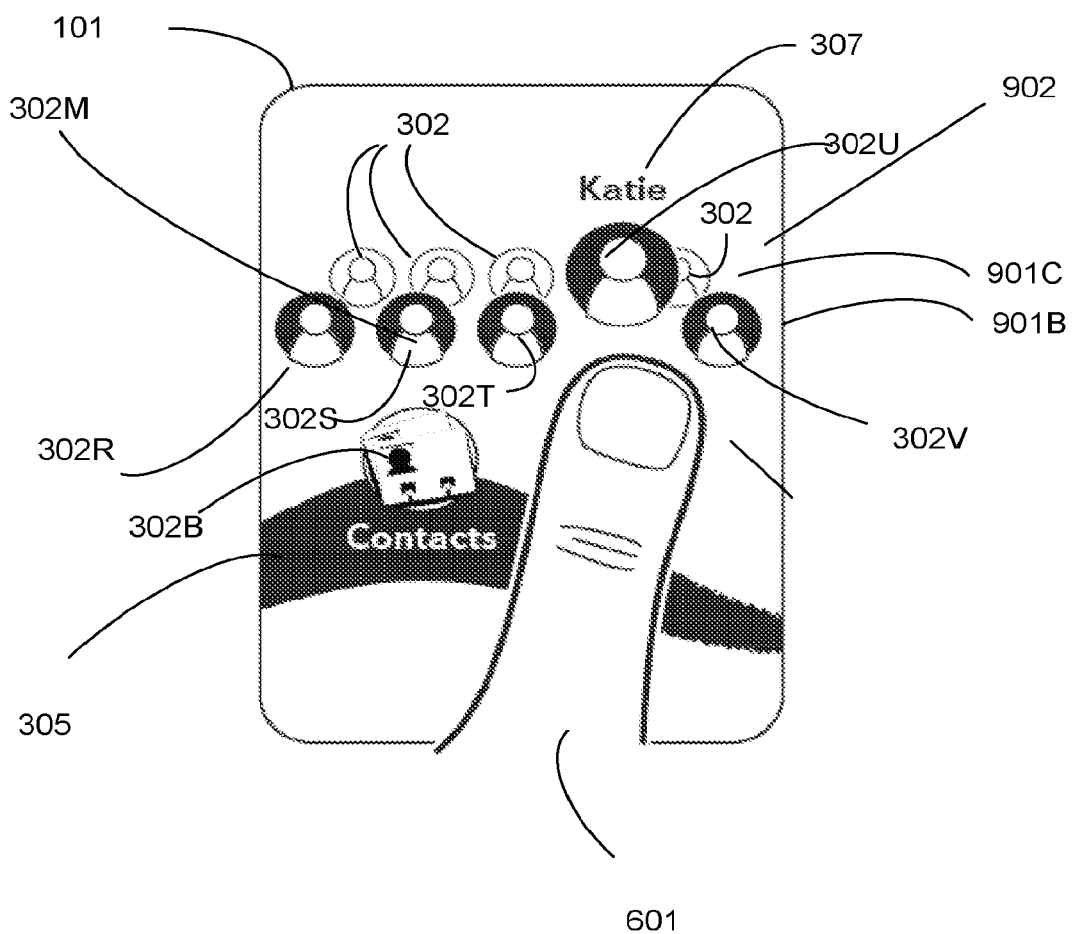

Referring now to FIGS. 9A and 9B, there is shown a series of screen shots depicting an example of a grid layout for a hierarchical launch wave 305 according to one embodiment. In this example, a contacts item (not shown, because it is obscured by finger 601) in the top level of launch wave 305 has been highlighted. The user has moved finger in an upward direction (or has held finger 601 over the contacts item to cause it to remain highlighted for some period of time), causing a grid 902 of subordinate items 302 for individual contacts to be displayed. In the example, grid 902 contains three rows 901A, 901B, 901C, although any number of rows 901 could be displayed, so as to show the desired number of items 302. In the example, grid 902 is presented in a perspective view, with some rows depicted as though they are positioned behind other rows.

A frontmost row 901A is shown, containing items 302L, 302M, 302N, 302P, 302Q. In the example, finger 601 is positioned near item 302M, so that item is highlighted, and label 307 is displayed. In one embodiment, frontmost row 901A is shown using a distinctive visual appearance (such as bolder and/or larger) as compared with other displayed rows 901B, 901C. Rows 901B, 901C also contain items 302.

The user can navigate within a row 901, to cause other items 302 in the row 901 to be highlighted, by moving finger 601 to the left or right. The user can navigate from one row 901 to another 901 by moving finger 601 upwards or downwards. The user can select (activate) an item 302 within any row 901 by removing finger 601 from display 101 while finger 601 is positioned over the desired item 302.

In one embodiment, moving upward to a row 901 that is "behind" the frontmost currently displayed row 901 causes the frontmost row 901 to be dismissed. The user can cause the frontmost row 901 to reappear by moving finger 601 in a downward direction. FIG. 9B depicts grid 902 after user has moved upward, causing the frontmost row 901A to be dismissed. Accordingly, in FIG. 9B, only rows 901B and 901C are shown. Row 901B contains items 302R, 302S, 302T, 302U, and 302V, with item 302U being highlighted based on the position of finger 601. In addition, FIG. 9B shows contacts item 302B since finger 601 no longer obscures it.

In other embodiments, frontmost row 901A is not dismissed when the user navigates to other rows 901B, 901C.

The grid-based arrangement described herein allows a user to navigate directly to an individual contact record by moving to the appropriate row 901 within grid 902 and highlighting and activating one of the desired 302. Thus, initial invocation of launch wave 305, navigation to the desired row 901 and item 302, and activation of item 302 can all be performed in a single continuous gesture.

The various features described above can be implemented singly or in any combination, as will be apparent to one skilled in the art.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, consumer electronic device, television, set-top box, or the like. An electronic device for implementing the present invention may use an operating system such as, for example, Microsoft Windows Vista available from Microsoft Corporation of Redmond, Wash., or any other operating system that is adapted for use on the device. In some embodiments, the electronic device for implementing the present invention includes functionality for communication over one or more networks, including for example a cellular telephone network, wireless network, and/or computer network such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for operating a mobile computing device, the method being performed by one or more processors and comprising:

detecting a gesture performed by a user, the gesture including at least a motion that (i) is initiated by user contact on a touch-sensitive gesture region of the mobile computing device with an object, and (ii) continues onto a touch-sensitive display screen of the mobile computing device; and in response to detecting the gesture, presenting a launcher interface on the touch-sensitive display screen, wherein a shape of the launcher interface dynamically changes based, at least in part, on a location of the object while the gesture is performed by the user.

2. The method of claim 1, wherein the launcher interface includes a plurality of selectable graphic items, each of the plurality of selectable graphic items corresponding to an application or activity that is operable on the mobile computing device.

3. The method of claim 2, further comprising:

highlighting one of the plurality of selectable graphic items that is closest to the location of the object while the gesture is performed by the user by performing at least one of: (i) presenting text corresponding to the highlighted selectable graphic item, (ii) enlarging a size of the highlighted selectable graphic item, or (iii) decreasing a size of others of the plurality of selectable graphic items.

4. The method of claim 2, wherein presenting the launcher interface comprises displaying a scrollable launcher interface, and wherein the method further comprises:

responsive to a user input indicating a scrolling operation, introducing in the scrollable launcher interface, at least one additional selectable graphic item.

5. The method of claim 2, wherein the launcher interface comprises at least one top-level item associated with at least one subordinate selectable graphic item, and the method further comprising:
responsive to an additional user input indicating that, for an indicated top-level item, at least one subordinate selectable graphic item should be displayed:
displaying at least one subordinate selectable graphic item associated with the indicated top-level item;
highlighting the at least one subordinate selectable graphic item;
detecting a second additional user input comprising movement of a point of contact on the touch-sensitive display screen;
in response to detecting the second additional user input, altering the shape of the launcher based on the movement of the point of contact.

6. The method of claim 5, wherein at least one of the top-level items associated with at least one subordinate selectable graphic item comprises a user-activatable top-level item.

7. The method of claim 5, wherein displaying at least one subordinate selectable graphic item associated with the indicated top-level item comprises displaying the at least one subordinate selectable graphic item at a position subordinate to the indicated top-level item.

8. The method of claim 2, wherein the launcher interface comprises at least one top-level item associated with at least one subordinate selectable graphic item, and the method further comprising:
responsive to an additional user input indicating that, for an indicated top-level item, at least one subordinate selectable graphic item should be displayed:
displaying a grid comprising at least one subordinate selectable graphic item associated with the indicated top-level item;
highlighting the at least one subordinate selectable graphic item;
detecting a second additional user input comprising movement of a point of contact on the touch-sensitive display screen;
in response to detecting the second additional user input, highlighting a different subordinate selectable graphic item on the grid corresponding to the movement of the point of contact.

9. A mobile computing device comprising:
a touch-sensitive display screen;
a touch-sensitive gesture region; and
one or more processors coupled to the touch-sensitive display screen and the touch-sensitive gesture region, the one or more processors configured to:
detect a gesture performed by a user, the gesture including at least a motion that (i) is initiated by user contact on the touch-sensitive gesture region with an object, and (ii) continues onto the touch-sensitive display screen; and
in response to detecting the gesture, present a launcher interface on the touch-sensitive display screen, wherein a shape of the launcher interface dynamically changes based, at least in part, on a location of the object while the gesture is performed by the user.

10. The mobile computing device of claim 9, wherein the launcher interface includes a plurality of selectable graphic items, each of the plurality of selectable graphic items corresponding to an application or activity that is operable on the mobile computing device.

11. The mobile computing device of claim 10, wherein the one or more processors are further configured to highlight one of the plurality of selectable graphic items that is closest to the location of the object while the gesture is performed by the user.

12. The mobile computing device of claim 11, wherein the one or more processors is configured to highlight one of the plurality of selectable graphic items by performing at least one of: (i) presenting text corresponding to the highlighted selectable graphic item, (ii) enlarging a size of the highlighted selectable graphic item, or (iii) decreasing a size of others of the plurality of selectable graphic items.

13. The mobile computing device of claim 11, wherein the one or more processors are further configured to launch an application or activity corresponding to the highlighted selectable graphic item in response to the user removing the object from the touch-sensitive display screen.

14. The mobile computing device of claim 13, wherein the one or more processors are further configured to dismiss the launcher interface from the touch-sensitive display screen in response to the user removing the object from the touch-sensitive display screen.

15. A non-transitory computer-readable medium that stores instructions that, when executed by one or more processors, cause the one or more processors to perform operations comprising:
detecting a gesture performed by a user, the gesture including at least a motion that (i) is initiated by user contact on a touch-sensitive gesture region of a mobile computing device with an object, and (ii) continues onto a touch-sensitive display screen of the mobile computing device; and
in response to detecting the gesture, presenting a launcher interface on the touch-sensitive display screen, wherein a shape of the launcher interface dynamically changes based, at least in part, on a location of the object while the gesture is performed by the user.

* * * * *